United States Patent
Jo et al.

(10) Patent No.: US 10,486,583 B2
(45) Date of Patent: Nov. 26, 2019

(54) MULTIFUNCTIONAL LOCKING DEVICE FOR CONTAINER OF TRAILER

(71) Applicant: YooGunENG Co., LTD., Busan (KR)

(72) Inventors: Hyon il Jo, Busan (KR); Kwang heui Han, Busan (KR); Jae min Cho, Busan (KR)

(73) Assignee: Yooguneng Co., Ltd., Busan (KR)

( * ) Notice: Subject to any disclaimer, the term of this patent is extended or adjusted under 35 U.S.C. 154(b) by 69 days.

(21) Appl. No.: 15/579,025

(22) PCT Filed: Dec. 10, 2015

(86) PCT No.: PCT/KR2015/013478
§ 371 (c)(1),
(2) Date: Dec. 1, 2017

(87) PCT Pub. No.: WO2017/094948
PCT Pub. Date: Jun. 8, 2017

(65) Prior Publication Data
US 2018/0141482 A1    May 24, 2018

(30) Foreign Application Priority Data

Dec. 3, 2015   (KR) .................. 10-2015-0171576

(51) Int. Cl.
*B60P 7/13*     (2006.01)
*B65D 90/00*    (2006.01)
*E05B 83/02*    (2014.01)
*E05C 5/02*     (2006.01)

(52) U.S. Cl.
CPC ............. *B60P 7/132* (2013.01); *B65D 90/00* (2013.01); *E05B 83/02* (2013.01); *E05C 5/02* (2013.01)

(58) Field of Classification Search
CPC ........ B60P 7/13; B60P 7/132; B65D 90/0013; E05B 83/02; E05C 5/02; B61D 45/00; B61D 45/007
USPC .................. 410/69, 70, 71, 77, 82, 83
See application file for complete search history.

(56) References Cited

U.S. PATENT DOCUMENTS

| | | | | |
|---|---|---|---|---|
| 4,212,251 A | * | 7/1980 | DiMartino | B65D 90/0013 220/1.5 |
| 4,266,820 A | * | 5/1981 | Whaley | B60P 7/132 296/35.3 |
| 4,437,211 A | * | 3/1984 | Dorpmund | B60P 7/132 24/287 |

(Continued)

FOREIGN PATENT DOCUMENTS

| EP | 1532045 B1 * | 3/2010 | ......... B65D 90/0013 |
|---|---|---|---|
| WO | WO-2005095157 A1 * | 10/2005 | ............. B60P 7/132 |

OTHER PUBLICATIONS

PCT/KR15/13478 Form 237, translation, Jan. 2015 (Year: 2015).*

Primary Examiner — Hilary L Gutman
(74) Attorney, Agent, or Firm — Muncy, Geissler, Olds & Lowe, P.C.

(57) ABSTRACT

The present invention relates to a multifunctional locking device for a container of a trailer, in which a lock is operated by the weight of the container, whereby it is possible to automatically or manually lock the container to the trailer, and it is possible to prevent movement and disengagement of the container due to the increased fixing force of the container during trailer operation, thereby improving stability.

19 Claims, 21 Drawing Sheets

(56) References Cited

U.S. PATENT DOCUMENTS

| | | | | |
|---|---|---|---|---|
| 4,776,736 A | * | 10/1988 | Tatina | B60P 7/13 410/69 |
| 5,927,916 A | * | 7/1999 | Kroll | B60P 7/132 410/77 |
| 6,692,203 B2 | * | 2/2004 | Kim | B60P 7/132 410/69 |
| 7,231,695 B2 | * | 6/2007 | Park | B65D 90/0013 220/23.4 |
| 7,484,918 B2 | * | 2/2009 | Brewster | B60P 7/132 410/69 |
| 7,988,391 B2 | * | 8/2011 | Schulze | B64D 9/003 410/69 |
| 8,157,492 B2 | * | 4/2012 | Franzen | B60P 7/13 410/69 |
| 8,348,564 B2 | * | 1/2013 | Fukui | B65D 90/0013 410/69 |
| 8,900,240 B2 | * | 12/2014 | White | A61B 17/7032 606/86 A |
| 2011/0116886 A1 | * | 5/2011 | Franzen | B60P 7/13 410/70 |
| 2017/0158110 A1 | * | 6/2017 | Jo | B60P 7/132 |

* cited by examiner

MULTIFUNCTIONAL LOCKING DEVICE FOR CONTAINER OF TRAILER

TECHNICAL FIELD

The present invention relates generally to a multifunctional locking device for a container of a trailer. More particularly, the present invention relates to a multifunctional locking device for a container of a trailer, in which a lock is operated by the weight of the container, whereby it is possible to automatically or manually lock the container to the trailer, and it is possible to prevent movement and disengagement of the container due to the increased fixing force of the container during trailer operation, thereby improving stability.

BACKGROUND ART

In general, a container is a kind of transport container which is a standardized box that can carry a large quantity of cargo for land transportation or shipment transportation and refers to a box for transporting cargo safely and conveniently. The container is also standardized receiving equipment for a bulk cargo.

Containers are transported on container vehicles on land, and at sea, a large number of containers are transported using large container carriers to load containers.

A vehicle called trailer is used as a means of transporting the container by land, wherein the trailer which is without a driving power device or a control device is generally pulled by a tractor.

The trailer is designed to fit the size of the container so that a standardized container can be loaded, and is designed considering the weight of cargo loaded in the container. The trailer loads one or two containers, and in order to prevent the container from separating from the trailer in case of sudden braking, curved roads, slope, and other unexpected situations that occur during transportation, a locking device for locking the container is provided at the upper portion of the trailer.

The use of the locking device has been systematically mandated and prior art of manual or automatic methods have been proposed.

FIGS. 1a and 1b are sectional views showing a manual locking device according to the conventional art before and after operation.

As shown in FIGS. 1a and 1b, the manual locking device according to the conventional art is configured such that a lock 2 performing locking or unlocking functions by rotation and up and down movement of a lever 3 is provided at multiple locations of an upper frame 1 provided in a trailer, whereby as a driver manipulates the lever 3 of the lock 2 with the container 4 mounted at a predetermined location of the upper frame 1, a head part 2' provided at the upper portion of the lock 2 is inserted into and engaged with a coupling hole 5 formed in a lower surface of the container.

In other words, the manual locking device allows the trailer and the container loaded thereon to be integrally coupled together, thereby providing stability during transport.

However, since the locking device is cumbersome in the state where the container is loaded, most drivers do not operate the locking device. In particular, when driving on poor roads or rough curves without locking the container, a major accident, such as a container separating or falling from the trailer, may happen.

To solve the above problem, an automatic locking device has been disclosed in the document of Korean Utility Model Registration No. 20-0186762.

FIGS. 2a and 2b are sectional views showing an automatic locking device according to the conventional art before and after operation.

As shown in FIGS. 2a and 2b, the automatic locking device according to the conventional art includes: an actuator 20 having a hollow portion 21 provided in a cylindrical housing 10 mounted to an upper frame of a trailer, and configured to be moved upward by an elastic force of an elastic spring 22 and an external load; a lock 30 including a head part 31 provided coaxially with the hollow part 21 of the actuator 20 and inserted into the container, and a stop protrusion 32 operation in conjunction with the operation of the actuator 20; a slit groove 41 with a curved surface formed in a groove 40 having a predetermined depth formed in the lock 30, and configured to induce the lock 30 to be rotated to a predetermined range when moved down; a support shaft 50 fixedly provided in a cover 11 coupled to a lower surface of the housing 10 to freely slide in the groove 40 by means of an elastic spring 52; and a pin 51 provided on an upper outer circumference of the support shaft 50, and configured to displace a direction of the lock 30 that is moved up and down along the slit groove 41 based on a location, as a fixed axis, where the pin is inserted into the slit groove 41.

In other words, the automatic locking device automatically performs locking and unlocking functions by the weight of the container in the process of loading or unloading containers, whereby it is possible to transport the heavy container while safely locking it, and is possible to prevent inconvenience caused by the operation of the lock.

However, the automatic locking device according to the conventional art is problematic in that when locking and unlocking functions are not normally performed due to malfunction of the components, the locking device is disassembled and dismounted from the trailer, and then replaced with a new locking device.

The automatic locking device is further problematic in that a horizontal impact load is applied to the container due to rapid operation of the trailer, sudden braking, sharp curves, etc. At this time, the impact is directly applied to the lock and the hollow portion coupled to the container and the actuator, whereby durability is degraded due to damage to the components coupled with the lock, which causes malfunction.

Meanwhile, containers are loaded or unloaded on trailers using dedicated devices or forklifts. Here, the head part of the lock may not be correctly inserted into the connector of the container and be displaced. In this case, the load of the container is transferred to the head part of the lock rather than the actuator, and thus the lock is vertically moved down without being properly inserted into the connector, whereby the components coupled with the lock may be damaged, and engagement may not be performed easily.

DISCLOSURE

Technical Problem

Accordingly, the present invention has been made keeping in mind the above problems occurring in the related art, and the present invention is intended to propose a multifunctional locking device for a container of a trailer, in which locking and unlocking functions can be used by easily switching to a manual mode even if the automatic locking and unlocking functions are not normally performed due to malfunction.

The present invention is further intended to propose a multifunctional locking device for a container of a trailer, in which the impact applied directly to the lock due to a horizontal load applied to the container is prevented, whereby it is possible to improve durability of the device, and is possible to minimize malfunction thereof.

The present invention is further intended to propose a multifunctional locking device for a container of a trailer, in which even if the head part of the lock is not correctly inserted into the connector of the container and is displaced, it is possible to prevent damage to the components coupled with the lock, and is possible to facilitate engagement with the connector of the container.

Meanwhile, the objectives presented by the present invention are not limited to the objectives mentioned above, and other objectives not mentioned may be clearly understood by those skilled in the art from the following description.

Technical Solution

In order to achieve the above object, according to some aspect of the present invention, there is provided a multifunctional locking device for a container of a trailer, which is provided in an upper frame of the trailer in plural so as to lock the container to the upper frame, the multifunctional locking device including: an outer housing mounted to the upper frame, and provided with an opening portion on at least one surface thereof; a hollow inner housing accommodated in the outer housing while being spaced apart therefrom; an automatic actuator accommodated in the inner housing, and configured to move up and down by a first elastic member and weight of the container; a lock including a cylindrical body part accommodated in a hollow portion of the automatic actuator, a head part provided in an upper portion of the body part and inserted into a connector of the container, a first stop protrusion provided on a first side of a circumferential surface of the body part and configured to operate in conjunction with up and down movement of the automatic actuator, and an induction portion formed on a second side of the circumferential surface of the body part and configured to operate in conjunction with the up and down movement of the automatic actuator so as to induce rotation of the body part; a guide member detachably coupled to an inside of the automatic actuator by passing the inner housing from outside of the inner housing such that an end portion is coupled to the induction portion, thereby rotating the lock according to the up and down movement of the automatic actuator; and a manual actuator including a lock extension part detachably coupled to a lower portion of the body part of the lock to extend downward in a hollow portion of the inner housing, a length adjusting part variably connected to the lock extension part such that a position of the length adjusting part relative to a length of the lock extension part is adjustable, and a lever protruding from a side of the length adjusting part to be operable by a user's hand.

In order to achieve the above object, according to some aspect of the present invention, there is further provided a multifunctional locking device for a container of a trailer, which is provided in an upper frame of the trailer in plural so as to lock the container to the upper frame, the multifunctional locking device including: an outer housing mounted to the upper frame, and provided with an opening portion on at least one surface thereof; a hollow inner housing accommodated in the outer housing while being spaced apart therefrom, and provided with a helical induction hole formed through the inner housing; an automatic actuator accommodated in the inner housing, and configured to move up and down by a first elastic member and weight of the container; a lock including a cylindrical body part accommodated in a hollow portion of the automatic actuator, a head part provided in an upper portion of the body part and inserted into a connector of the container, and a first stop protrusion provided on a first side of a circumferential surface of the body part and configured to operate in conjunction with up and down movement of the automatic actuator; a guide member detachably coupled through an inside of the automatic actuator via the induction hole of the inner housing to be engaged with a through-hole formed in the body part of the lock, thereby rotating the lock according to the up and down movement of the automatic actuator; and a manual actuator including a lock extension part detachably coupled to a lower portion of the body part of the lock to extend downward in a hollow portion of the inner housing, a length adjusting part variably connected to the lock extension part such that a position of the length adjusting part relative to a length of the lock extension part is adjustable, and a lever protruding from a side of the length adjusting part to be operable by a user's hand.

In order to achieve the above object, according to some aspect of the present invention, there is further provided a multifunctional locking device for a container of a trailer, which is provided in an upper frame of the trailer in plural so as to lock the container to the upper frame, the multifunctional locking device including: an outer housing mounted to the upper frame, and provided with an opening portion on at least one surface thereof; a hollow inner housing accommodated in the outer housing while being spaced apart therefrom and provided with at least one opening portion; an automatic actuator accommodated in the inner housing, and configured to move up and down by a first elastic member and weight of the container; a lock including a cylindrical body part accommodated in a hollow portion of the automatic actuator and moved up and down by both a second elastic member and the automatic actuator, a head part provided in an upper portion of the body part and configured to be coupled to or released from a connector of the container according to a rotation angle, a stop protrusion provided on a first side of a circumferential surface of the body part to limit upward movement of the body part, and an induction portion provided on a second side of the circumferential surface of the body part and configured to operate in conjunction with up and down movement of the automatic actuator so as to induce rotation of the body part; a hollow inner tube accommodated in the inner housing while being spaced apart therefrom and configured to accommodate the second elastic member and a portion of the body part of the lock; a guide member detachably coupled to an inside of the inner tube by passing the inner tube from outside of the inner tube such that an end portion thereof is coupled to the induction portion, thereby rotating the lock to move up and down; and a manual actuator including a lock extension part detachably coupled to a lower portion of the body part of the lock to extend downward in a hollow portion of the inner housing, a length adjusting part variably connected to the lock extension part such that a position of the length adjusting part relative to a length of the lock extension part is adjustable, and a lever protruding from a side of the length adjusting part to be operable by a user's hand.

In order to achieve the above object, according to some aspect of the present invention, there is further provided a multifunctional locking device for a container of a trailer, which is provided in an upper frame of the trailer in plural so as to lock the container to the upper frame, the multifunctional locking device including: an outer housing mounted to the upper frame, and provided with an opening portion on at least one surface thereof; a hollow inner housing accommodated in the outer housing while being spaced apart therefrom and provided with at least one opening portion; an automatic actuator accommodated in the inner housing, and configured to move up and down by a first elastic member and weight of the container; a lock including a cylindrical body part accommodated in a hollow portion of the automatic actuator and moved up and down by both a second elastic member and the automatic actuator, and a head part provided in an upper portion of the body part and configured to be coupled to or released from a connector of the container according to a rotation angle; a hollow inner tube accommodated in the inner housing while being spaced apart therefrom with the automatic actuator disposed therebetween, configured to accommodate the second elastic member and the body part, and provided at a side thereof with a helical induction hole formed therethrough; a guide member detachably coupled with a through-hole formed in the body part of the lock via the induction hole, thereby rotating the lock according to up and down movement of the automatic actuator; and a manual actuator including a lock extension part detachably coupled to a lower portion of the body part of the lock to extend downward in a hollow portion of the inner housing, a length adjusting part variably connected to the lock extension part such that a position of the length adjusting part relative to a length of the lock extension part is adjustable, and a lever protruding from a side of the length adjusting part to be operable by a user's hand.

Advantageous Effects

According to the embodiments of the present invention, the following effects can be expected.

First, even if the automatic locking and unlocking functions are not normally performed due to a malfunction, it is possible to use locking and unlocking functions without restrictions by easily switching to a manual mode.

Second, it is possible to improve durability of the device by preventing impact applied directly to the lock due to a horizontal load applied to the container, and is possible to minimize malfunction by simplifying the coupling structure.

Third, even if the head part of the lock is moved downward without being properly inserted into the connector of the container, it is possible to prevent damage to the components coupled with the lock, and is possible to facilitate engagement with the connector of the container.

Fourth, since automatic locking function is performed, it is possible to improve the efficiency of work when the container is loaded and unloaded.

Fifth, it is possible to secure safety by maintaining the locking state at all times when transporting a container.

Sixth, it is possible to pursue the convenience of a driver by combining both automatic and manual modes.

Figure 1A:
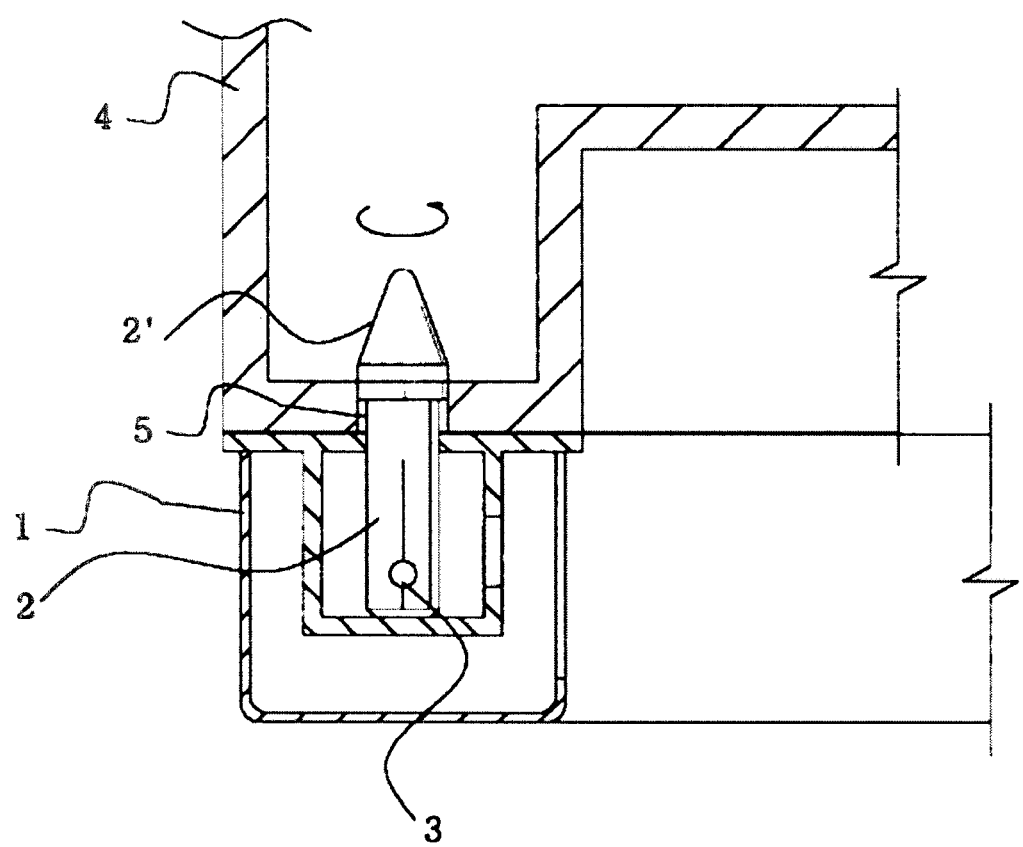
FIGS. 1a and 1b are sectional views showing a manual locking device according to the conventional art before and after operation.
Figure 1B:
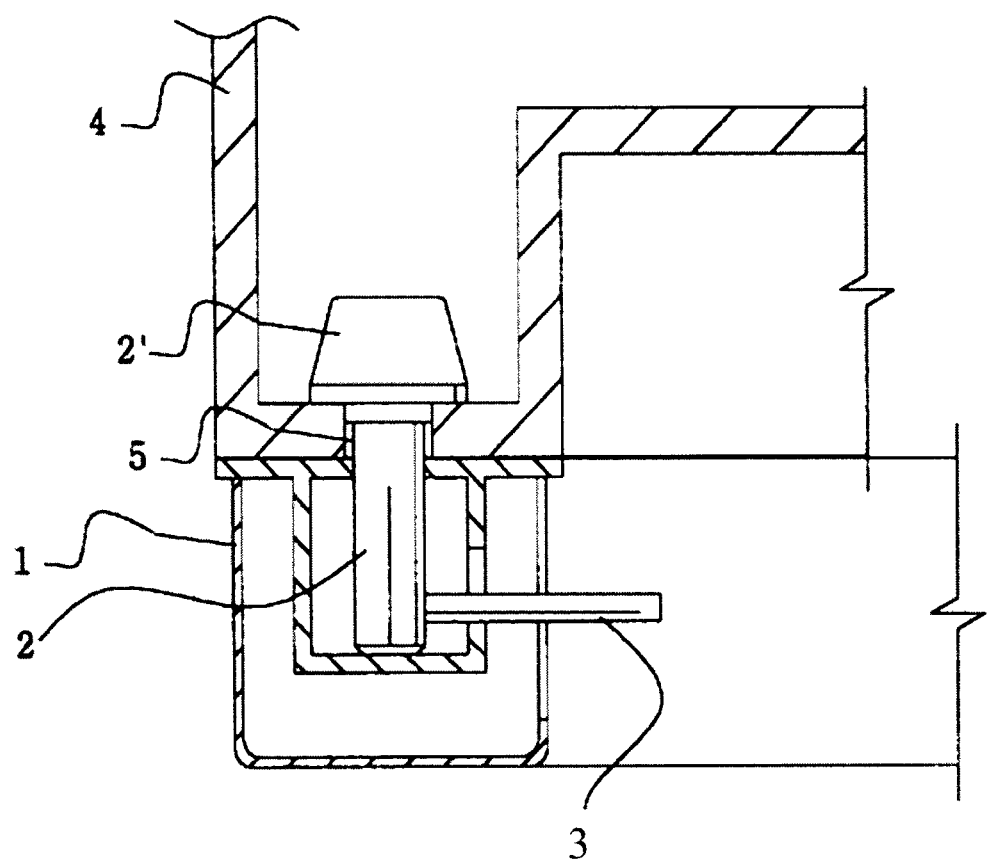
Figure 2A:
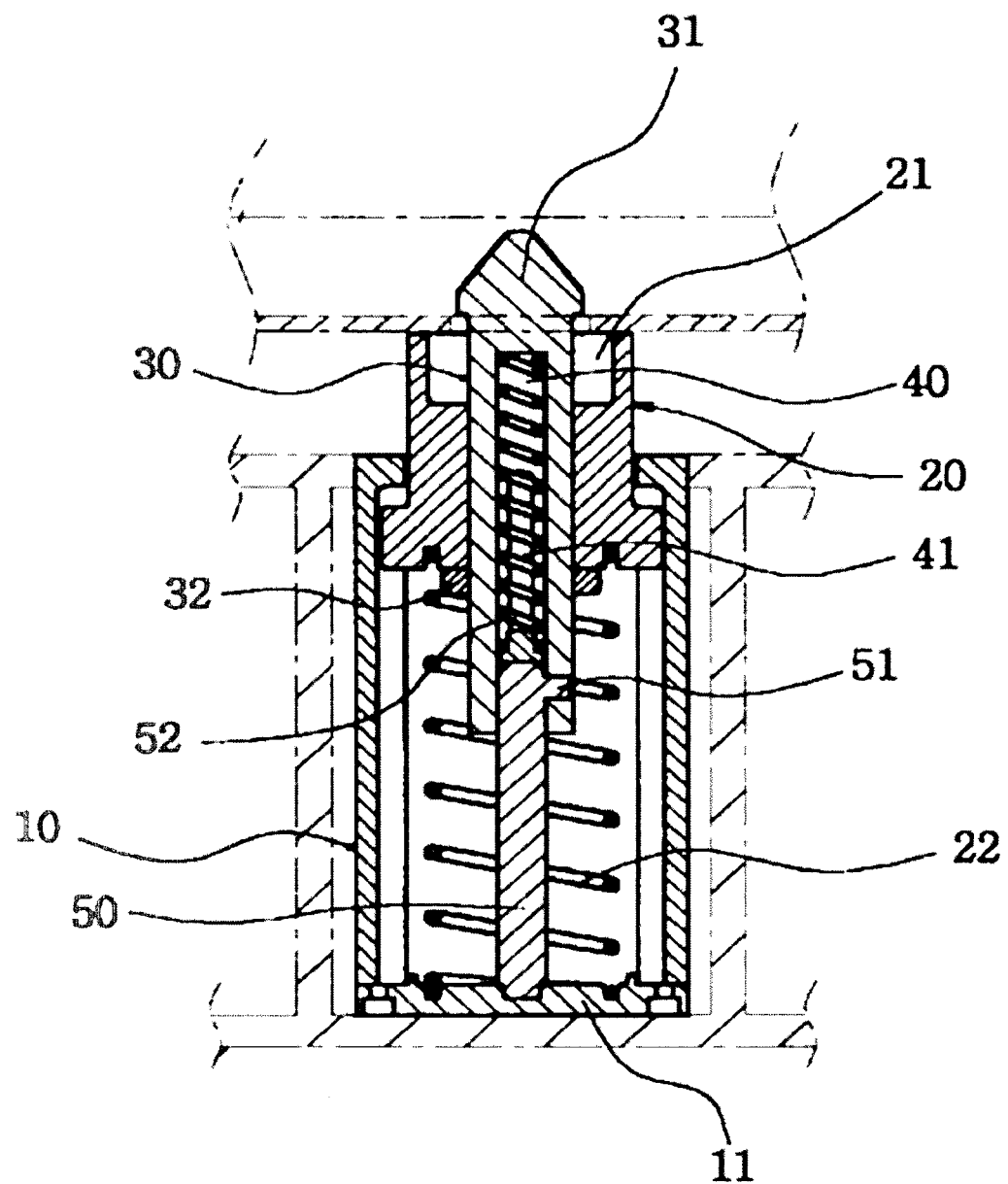
FIGS. 2a and 2b are sectional views showing an automatic locking device according to the conventional art before and after operation.
Figure 2B:
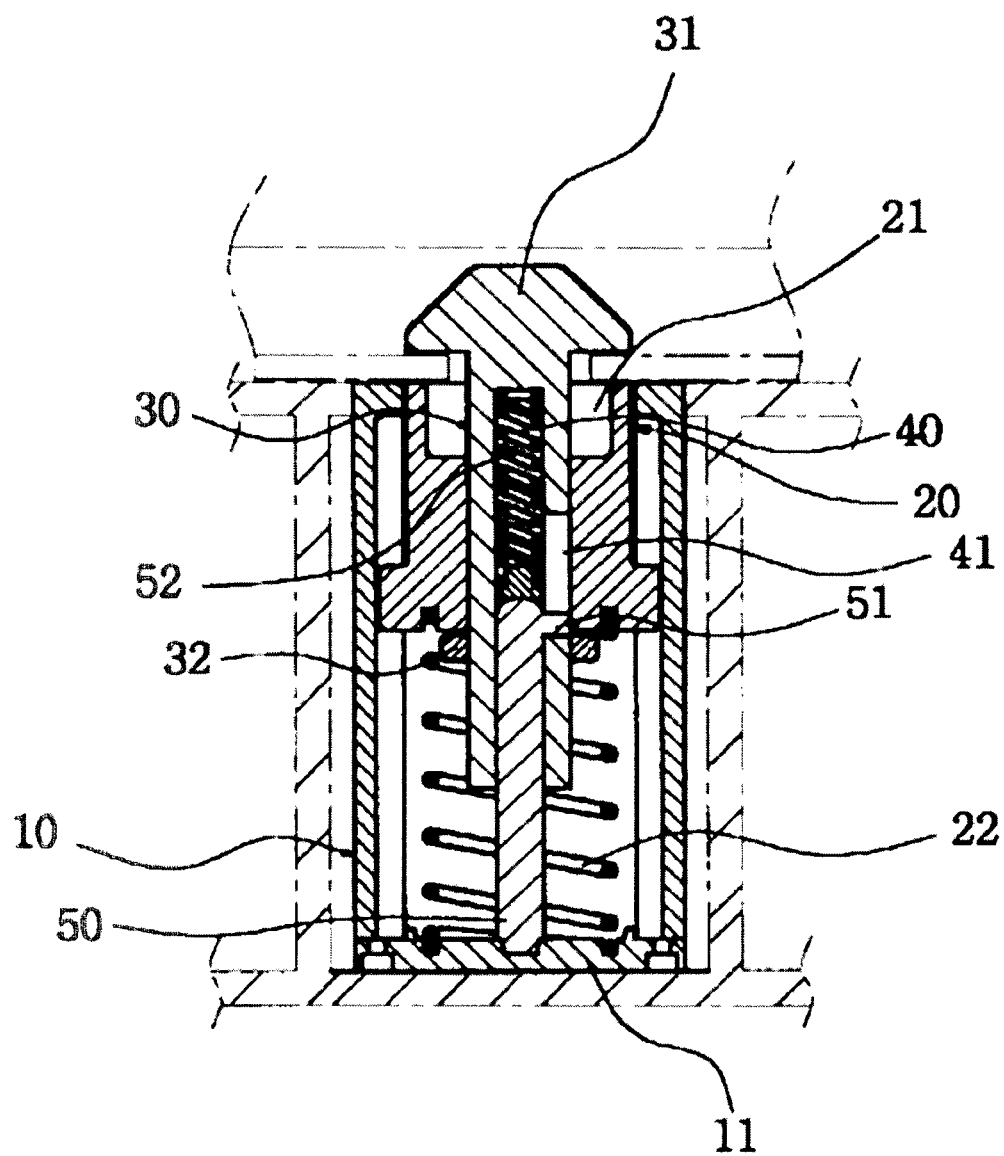

[Description of reference characters of important parts]

| | |
|---|---|
| A, B: length | C: interval |
| CT: container | 9: upper frame |
| 100: outer housing | 200: inner housing |
| 210, 230: through-hole | 220: induction groove |
| 300: automatic actuator | 310: pressing portion |
| 322: through-hole | 330: first stop member |
| 350a, b: second stop member | |
| 356b: buffering protrusion | |
| 370: second elastic member | 400: lock |
| 410: body part | |
| 411, 412, 414, 416, 418: induction portion | |
| 419: through-hole | 430: head part |
| 450: first stop protrusion | |
| 460: second stop protrusion | |
| 470: first elastic member | |
| 490: horizontal anti-skid protrusion | |
| 500: guide member | |
| 520: guide member end portion | |
| 600: manual actuator | 610: lock extension part |
| 630: length adjusting part | 650: lever |
| 700: support member | 710: lever fixing member |
| 1000: outer housing | 2000: inner housing |
| 2200: opening portion | 3000: automatic actuator |
| 3100: pressing portion | 3300: stop portion |
| 4000: lock | 4100: body part |
| 4120: first coupling protrusion | 4200: through-hole |
| 4300: head part | 4500: stop protrusion |
| 4700a, 4700b, 4700c: induction portion | |
| 4900: horizontal anti-skid protrusion | |
| 5000: support member | 5100: fixing member |
| 5200: first elastic member | |
| 5400: second elastic member | |
| 5600: buffering protrusion | 6000: inner tube |

[Description of reference characters of important parts]

6200: induction groove
8000: manual actuator
8120: second coupling protrusion
8300: length adjusting part
8500: lever
7000: guide member
8100: lock extension part

BEST MODE

Detailed features and advantages of the present invention will be apparent from the following detailed description based on the accompanying drawings. However, it should be understood that the embodiment of the present invention may be changed to a variety of embodiments and the scope and spirit of the present invention are not limited to the embodiment described hereinbelow. The embodiment of the present invention described hereinbelow is provided for allowing those skilled in the art to more clearly comprehend the present invention. Further, the terminology used herein is for the purpose of describing particular embodiments only and is not intended to be limiting. As used herein, the singular forms "a", "an", and "the" are intended to include the plural forms as well, unless the context clearly indicates otherwise.

Hereinbelow, preferred embodiments of the present invention will be described in detail with reference to the accompanying drawings. In the following description, it is to be noted that, when the functions of conventional elements and the detailed description of elements related with the present invention may make the gist of the present invention unclear, a detailed description of those elements will be omitted.

The present invention is provided in an upper frame of a trailer in plural so as to lock a container to the upper frame, and as shown in FIGS. 3 to 8, includes: an outer housing 100 mounted to the upper frame; an inner housing 200 accommodated in the outer housing 100 while being spaced apart therefrom; an automatic actuator 300 accommodated in the inner housing 200; a lock 400 accommodated in a hollow portion of the automatic actuator 300; a guide member 500 configured to rotate the lock 400 according to the up and down movement of the automatic actuator 300; and a manual actuator 600 configured to manually rotate the lock 400 when the guide member 500 is removed.

Each of the above components is operatively coupled to each other by an organized relationship, and description thereof will be made in more detail hereinbelow.

The outer housing 100 is mounted to the upper frame 9, and is formed with an opening portion on at least one surface thereof. The opening portion is not specifically shown but is formed so that the guide member 500 to be described hereinafter is visible when viewed from the outside.

Further, the outer housing 100 is configured such that a pressing portion 310 of the automatic actuator 300 and a head part 430 of the lock 400 protrude above the upper frame 9. Herein, not show in the drawings, a shape of the hollow portion of the outer housing 100 is formed to correspond to the peripheral shape of the pressing portion 310, so as to facilitate the up and down movement of the pressing portion 310 and to maintain the pressing portion 310 at a predetermined location without being separated in the horizontal direction.

The inner housing 200 is accommodated in the outer housing 100 while being spaced apart therefrom, and is formed in a hollow tube. The inner housing 200 is formed with a coupling hole with the guide member 500 engaged therewith, and an inner circumferential surface of the coupling hole is formed with threads, thereby facilitating engagement with the guide member 500.

Further, the inner housing 200 with a support member 700 supporting the same is accommodated in the outer housing 100, and the support member 700 is formed with a hollow portion, such that the manual actuator 600 to be described hereinafter is moved in and out. The support member 700 is coupled to the lower portion of the outer housing 100, so that a first elastic member 470 as well as the inner housing 200 can be supported together.

The automatic actuator 300 is accommodated in the inner housing 200, and is configured to move up and down by the first elastic member 470 and the weight of the container CT.

Herein, the automatic actuator 300 includes: the pressing portion moving out over the outer housing 100 and the hollow portion of the inner housing 200 as spaced apart from or brought into contact with the container; a first stop member 330 extending from a lower portion of the pressing portion 310 and moving a first stop protrusion 450 down by coming into contact therewith; and a second stop member 350 disposed at the lower portion of the first stop member 330 and configured to move the first stop protrusion 450 up by coming into contact therewith. Various embodiments of the automatic actuator 300 will be described hereinafter.

The lock 400 includes: a cylindrical body part 410 accommodated in the hollow portion of the automatic actuator 300; the head part 430 formed in the upper portion of the body part 410 and inserted into a connector of the container; the first stop protrusion 450 formed on a first side of the circumferential surface of the body part 410, and configured to operate in conjunction with the up and down movement of the automatic actuator 300; and an induction portion formed on a second side of the circumferential surface of the body part 410, and configured to operate in conjunction with the up and down movement of the automatic actuator 300 so as to induce rotation of the body part 410. Herein, various embodiments of the induction portion will be described hereinafter.

Meanwhile, the lock 400 may further include a horizontal anti-skid protrusion 490 surrounding a portion of the body part 410 with a predetermined gap therebetween, wherein the horizontal anti-skid protrusion 490 is fixed to the outer housing 100 to protect the lock 400 thereinside.

In other words, since the horizontal anti-skid protrusion 490 surrounds the lock 400 with the gap therebetween while being fixed to the outer housing 100, it is possible to prevent impact applied directly to the lock due to a horizontal load applied to the container CT. Accordingly, it is possible to improve durability of the device, and is possible to minimize malfunction by simplifying the coupling structure.

The guide member 500 is detachably coupled through from the outside of the inner housing 200 to the inside the automatic actuator 300 such that an end portion 520 is coupled to the induction portion, and is configured to rotate the lock 400 according to the up and down movement of the automatic actuator 300.

Herein, the outer circumferential surface of the guide member 500 is formed with threads so as to be engaged with the coupling hole of the inner housing 200.

Meanwhile, though not shown in the drawings, a guide fixing member that is brought into contact with at least a portion of the guide member 500 and fixed thereto is detachably coupled to the outside of the inner housing 200, so as to prevent separation of the guide member 500.

The manual actuator 600 includes: a lock extension part 610 detachably (or integrally) coupled to a lower portion of the body part 410 of the lock 400 or formed to extend downward in the hollow portion of the inner housing 200; a length adjusting part 630 variably connected to a predetermined location along a longitudinal direction of the lock extension part 610; and a lever 650 protruding from a side of the length adjusting part 630 to be operable by a user's hand.

The manual actuator 600 is configured such that in the state where the guide member 500 is engaged with the induction portion of the lock 400, the manual actuator rotates in conjunction with the automatic actuator 300, but in the state where the guide member 500 is disengaged from the induction portion of the lock 400, the manual actuator rotates regardless of the induction portion. Accordingly, by manually operating the lever 650 to rotate the lock 400, the head part 430 of the lock 400 is locked to or released from the connector of the container CT. Accordingly, even if the automatic locking and unlocking functions are not normally performed due to malfunction, it is possible to use locking and unlocking functions without restrictions by easily switching to a manual mode.

Meanwhile, the support member 700 may be provided with a lever fixing member 710 for fixing the lever, wherein the lever fixing member 710 is manually operated to fix the lever 650, thereby preventing the lock 400, especially in the state of being locked, from being rotated.

Hereinbelow, various embodiments of the present invention will be described in detail with reference to FIGS. 3 to 7. However, description of the configuration that is the same as the above described configuration will be omitted, and only the characteristically different configurations in the corresponding embodiment will be described in detail.

<First Embodiment>

Figure 3A:
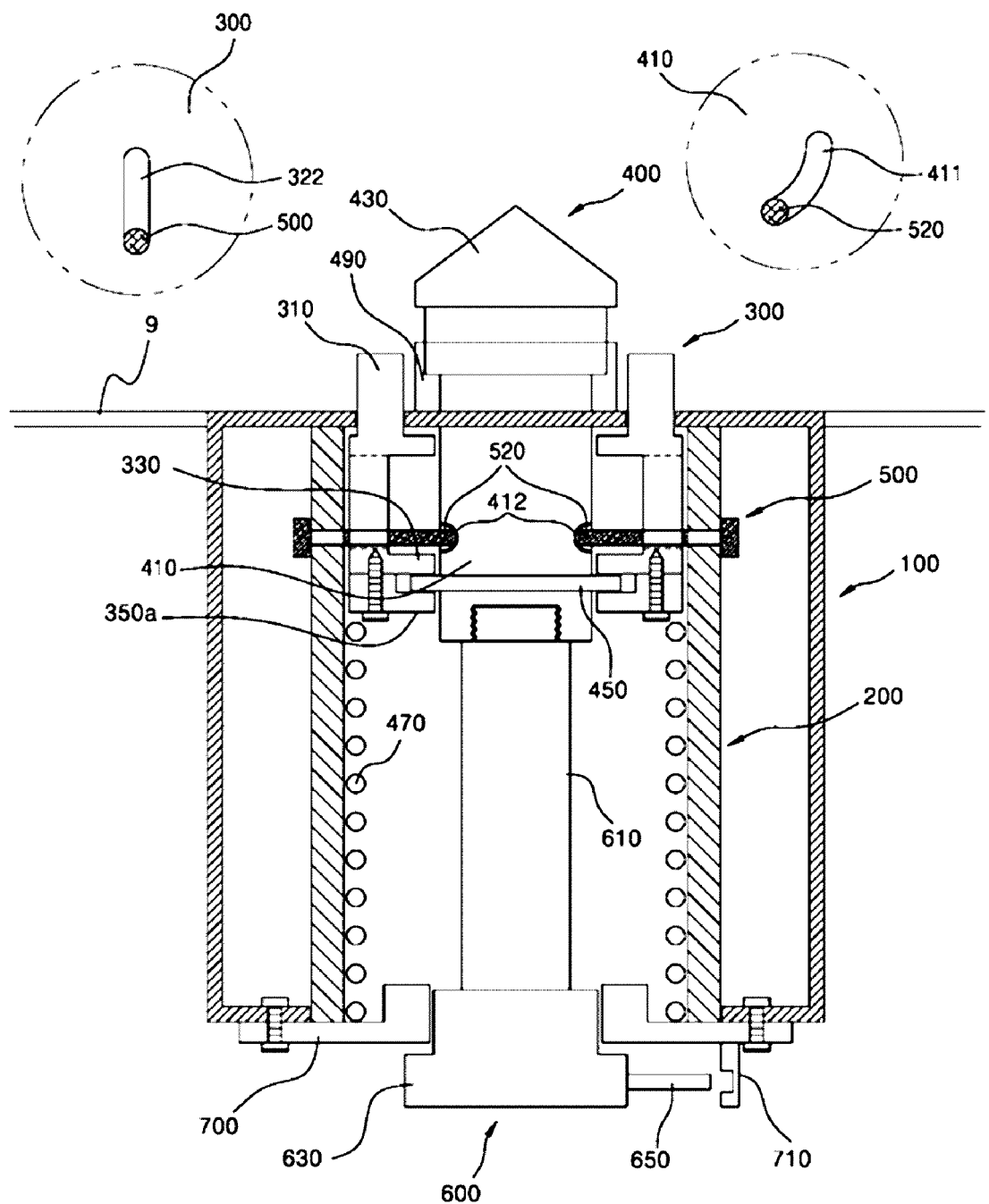
FIGS. 3a and 3b are sectional views showing a multifunctional locking device for a container for a trailer according to a first embodiment of the present invention before and after operation.
Figure 3B:
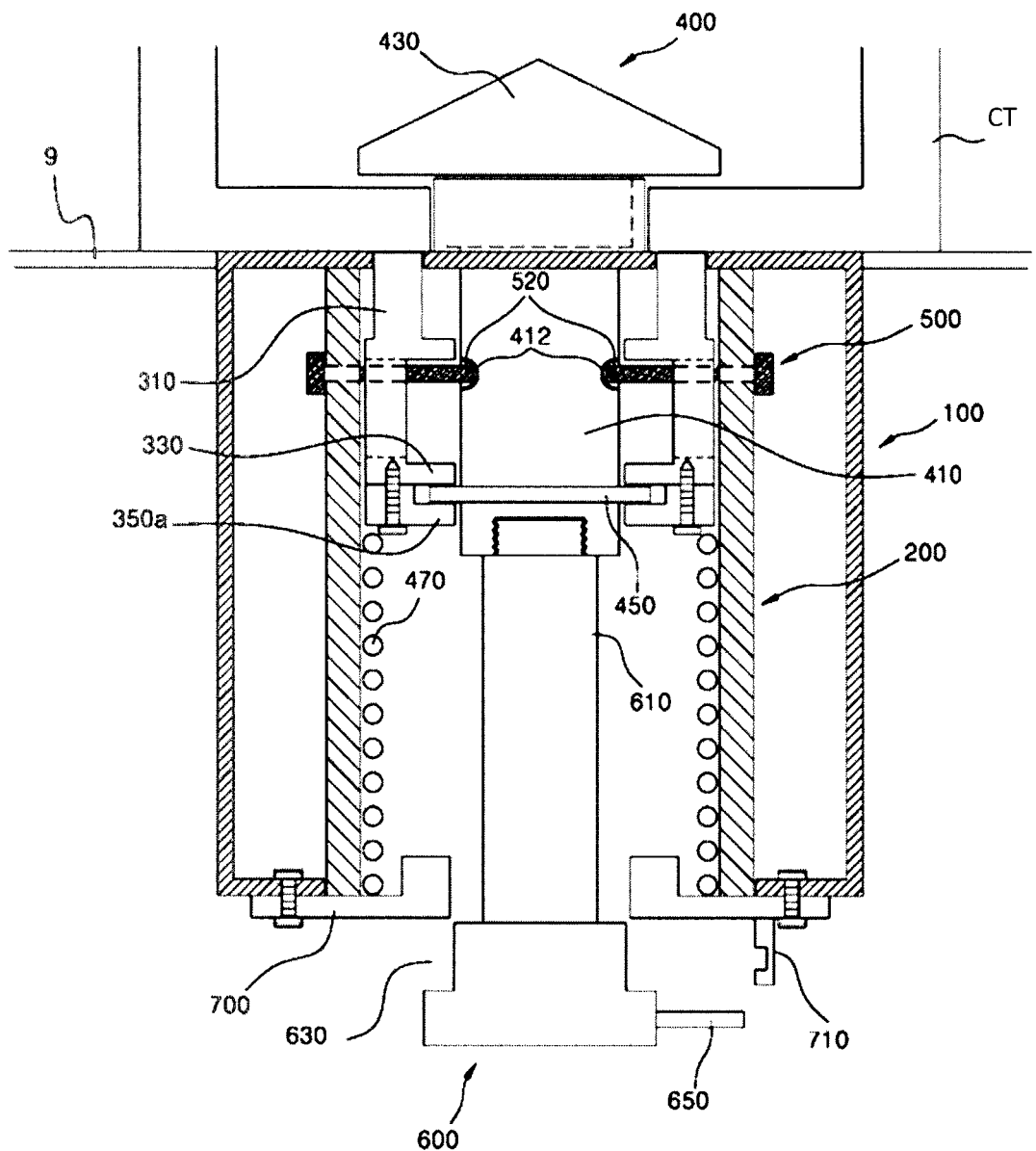

FIGS. 3a and 3b are sectional views showing a multi-functional locking device for a container of a trailer according to a first embodiment of the present invention before and after operation. FIG. 3a shows the locking device before operation, in which the head part 430 is not connected to the container, and FIG. 3b shows the locking device after operation, in which the automatic actuator 300 is moved down and thereby the head part 430 is rotated to be connected to the connector of the container CT.

Referring to FIGS. 3a and 3b, a second stop member 350a of the automatic actuator 300 is coupled to the first stop member 330 and elastically supported by the first elastic member 470, and the first stop member 330 and the second stop member 350a are disposed to be spaced apart from each other, such that a portion of the first stop protrusion 450 is accommodated in a gap defined therebetween. Accordingly, when the automatic actuator 300 is moved down, the first stop member 330 moves the first stop protrusion 450 down by coming into contact therewith, and when the automatic actuator 300 is moved up, the second stop member 350a moves the first stop protrusion 450 up by coming into contact therewith.

Herein, an induction portion 411 of the lock 400 is a helical groove 411 formed along the circumferential surface of the body part 410, so as to allow the end portion 520 of the guide member 500 to be inserted thereinto. In the embodiment, each of the induction portion 411 and the guide member 500 is provided in pair, but a single induction portion 411 and a single guide member 500 may be provided.

Here, it is preferred that a through-hole 322 of the automatic actuator 300 with the guide member 500 penetrating therethrough be formed in an oblong shape.

Further, an inner circumferential portion forming a hollow portion of the support member 700 is bent upward to provide a predetermined accommodation space, wherein the accommodation space allows the first elastic member 470 to be supported and prevents the first elastic member 470 from being separated.

<Second Embodiment>

Figure 4A:
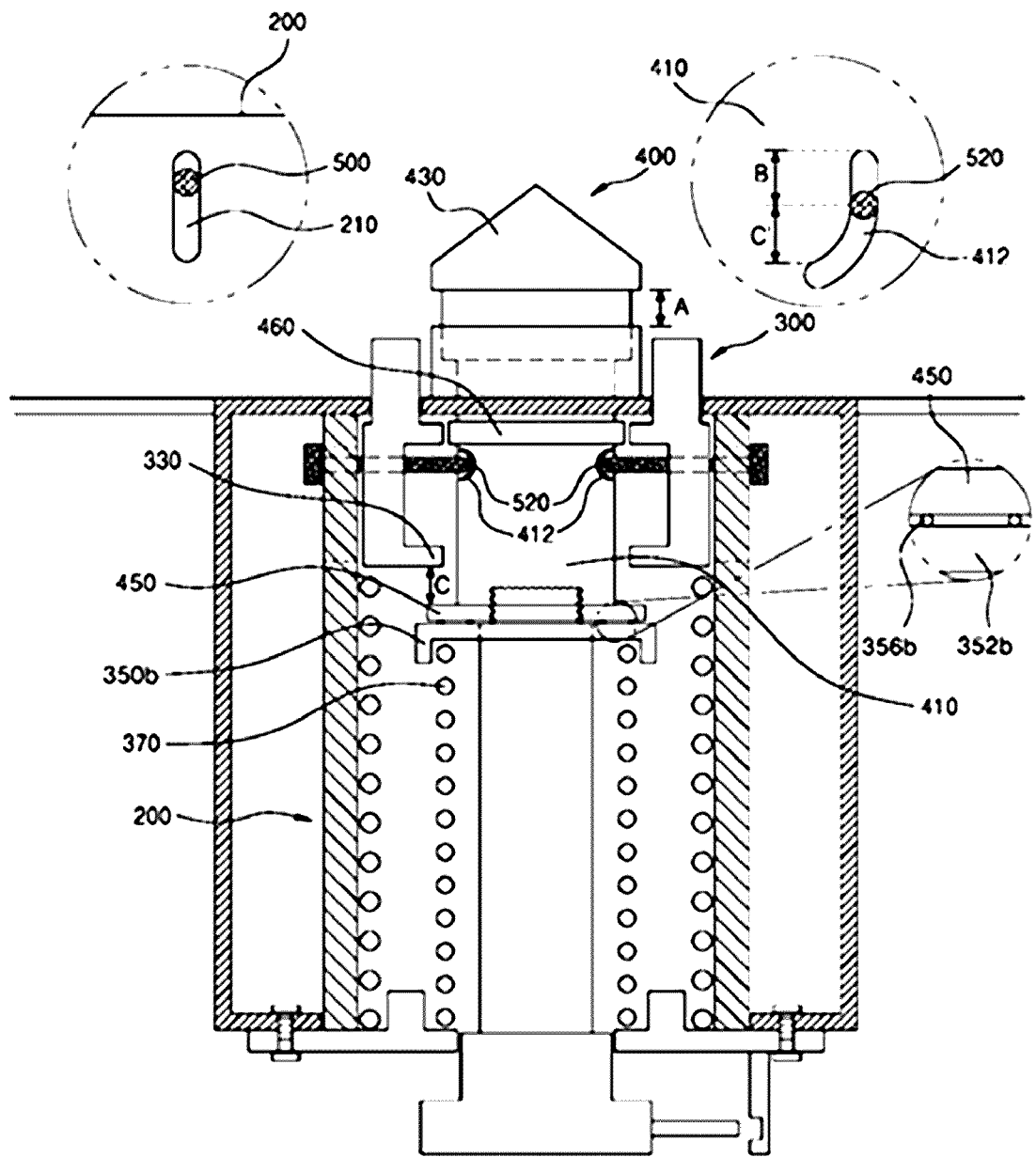
FIGS. 4a and 4b are sectional views showing a multifunctional locking device for a container for a trailer according to a second embodiment of the present invention before and after operation.
Figure 4B:
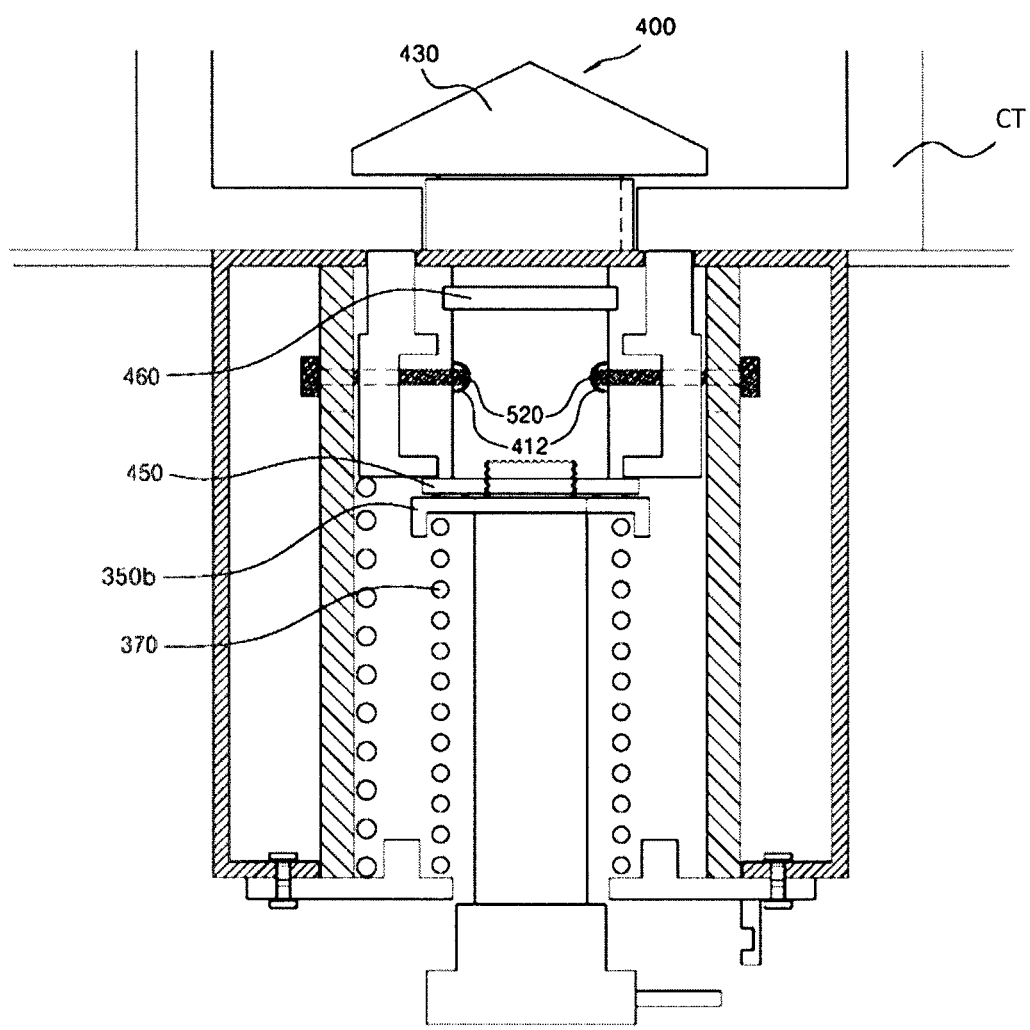

FIGS. 4a and 4b are sectional views showing a multi-functional locking device for a container of a trailer according to a second embodiment of the present invention before and after operation. FIG. 4a shows the locking device before operation, in which the head part 430 is not connected to the container, and FIG. 4b shows the locking device after operation, in which the automatic actuator 300 is moved down and thereby the head part 430 is rotated to be connected to the connector of the container CT.

Referring to FIGS. 4a and 4b, a second stop member 350b of the automatic actuator 300 is coupled to a lower portion of the first stop protrusion 450 and elastically supported by a second elastic member 370. Accordingly, when the automatic actuator 300 is moved down, the first stop member 330 moves the first stop protrusion 450 down by coming into contact therewith, and when the automatic actuator 300 is moved up, the second stop member 350b moves the first stop protrusion 450 up by coming into contact therewith. Here, the second elastic member 370 provides an elastic force to facilitate upward movement of the automatic actuator 300 and the lock 400.

Herein, as in the first embodiment, an induction portion 412 of the lock 400 is a helical groove 412 formed along the circumferential surface of the body part 410, so as to allow the end portion 520 of the guide member 500 to be inserted thereinto. Here, it is preferred that a through-hole 210 of the inner housing 200 with the guide member 500 penetrating therethrough be formed in an oblong shape.

Meanwhile, an embossed buffering protrusion 356b may be formed on one of the opposite surfaces to which the second stop member 350b and the first stop protrusion 450 are coupled, wherein the buffering protrusion 356b disperses an impact load and reduces friction between the first stop protrusion 450 and the second stop member 350b when the lock 400 is rotated.

Further, a step protruding along a circumferential direction is formed between a lower end surface of the inner housing 200 and an inner end of the support member 700, wherein based on the step, the first elastic member 470 can be supported in a space adjacent to the inner housing 200 and the second elastic member 370 can be supported in a space adjacent to the inner end of the support member 700.

<Third Embodiment>

Figure 5A:
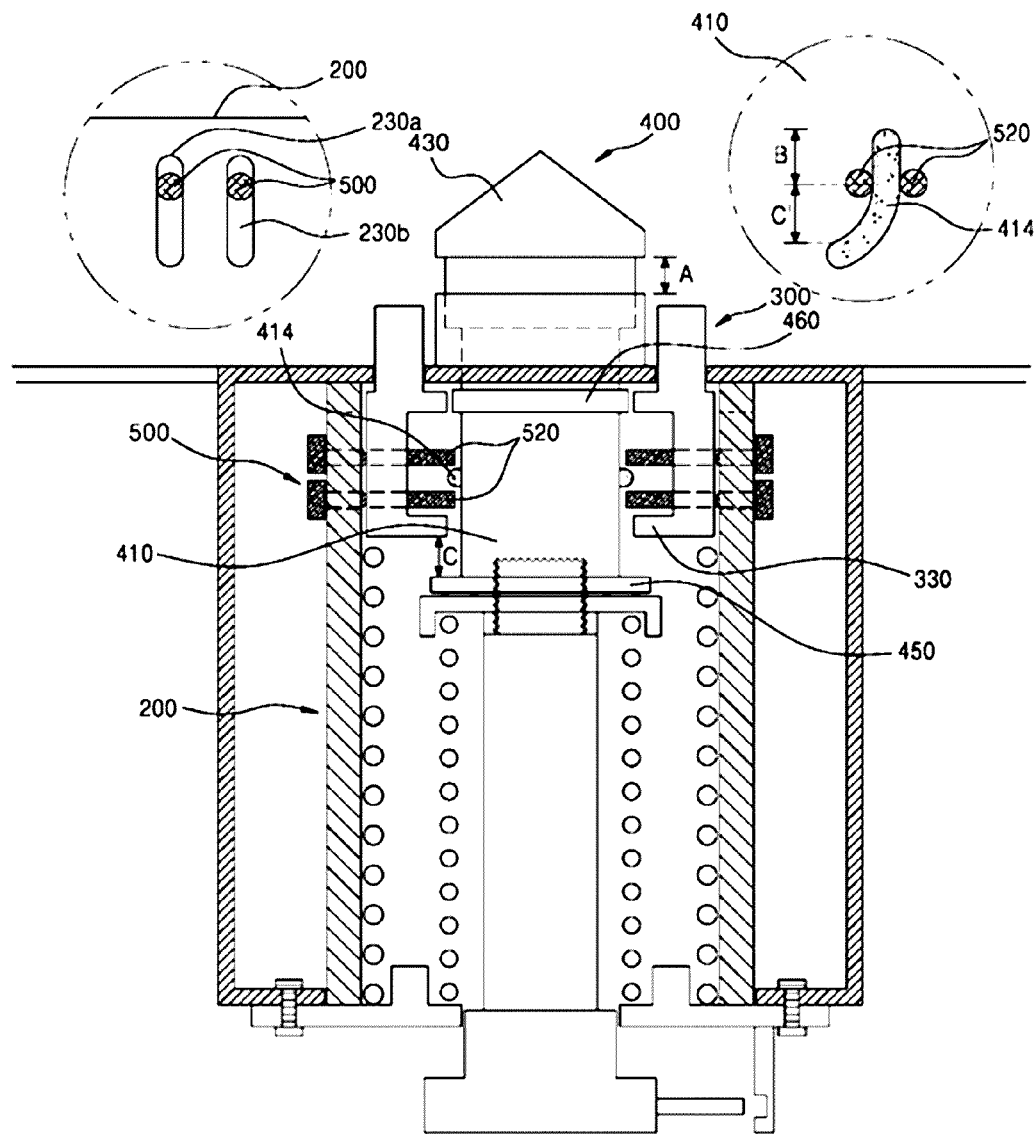
FIGS. 5a and 5b are sectional views showing a multifunctional locking device for a container for a trailer according to a third embodiment of the present invention before and after operation.
Figure 5B:
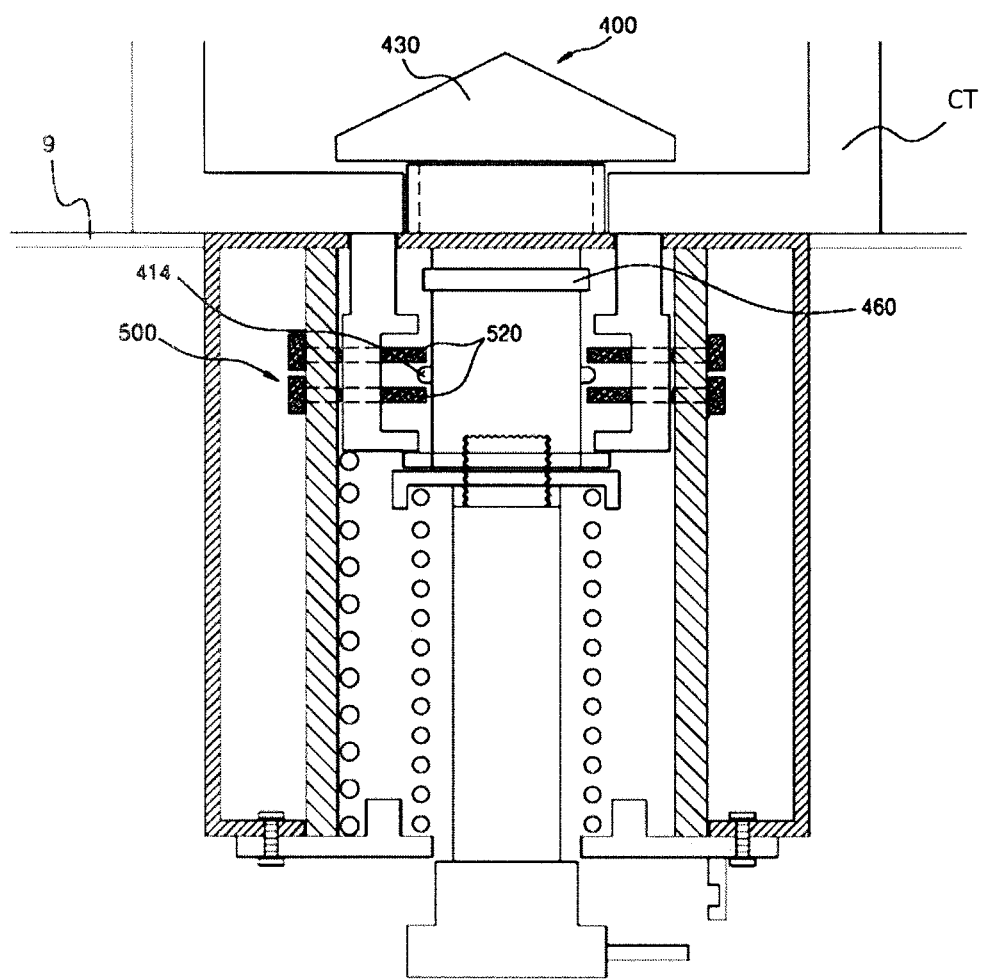

FIGS. 5a and 5b are sectional views showing a multi-functional locking device for a container of a trailer according to a third embodiment of the present invention before and after operation. FIG. 5a shows the locking device before operation, in which the head part 430 is not connected to the container, and FIG. 5b shows the locking device after operation, in which the automatic actuator 300 is moved down and thereby the head part 430 is rotated to be connected to the connector of the container CT.

Referring to FIGS. 5a and 5b, an induction portion 414 of the lock 400 is a helical protrusion 414 formed along the circumferential surface of the body part 410, and the guide member 500 is configured such that a pair thereof is disposed to be spaced apart from each other, such that a portion of the helical protrusion 414 is accommodated in a gap defined therebetween. Here, it is preferred that each of through-holes 230*a* and 230*b* of the inner housing 200 with the guide members 500 penetrating therethrough be formed in an oblong shape.

<Fourth Embodiment>

Figure 6:
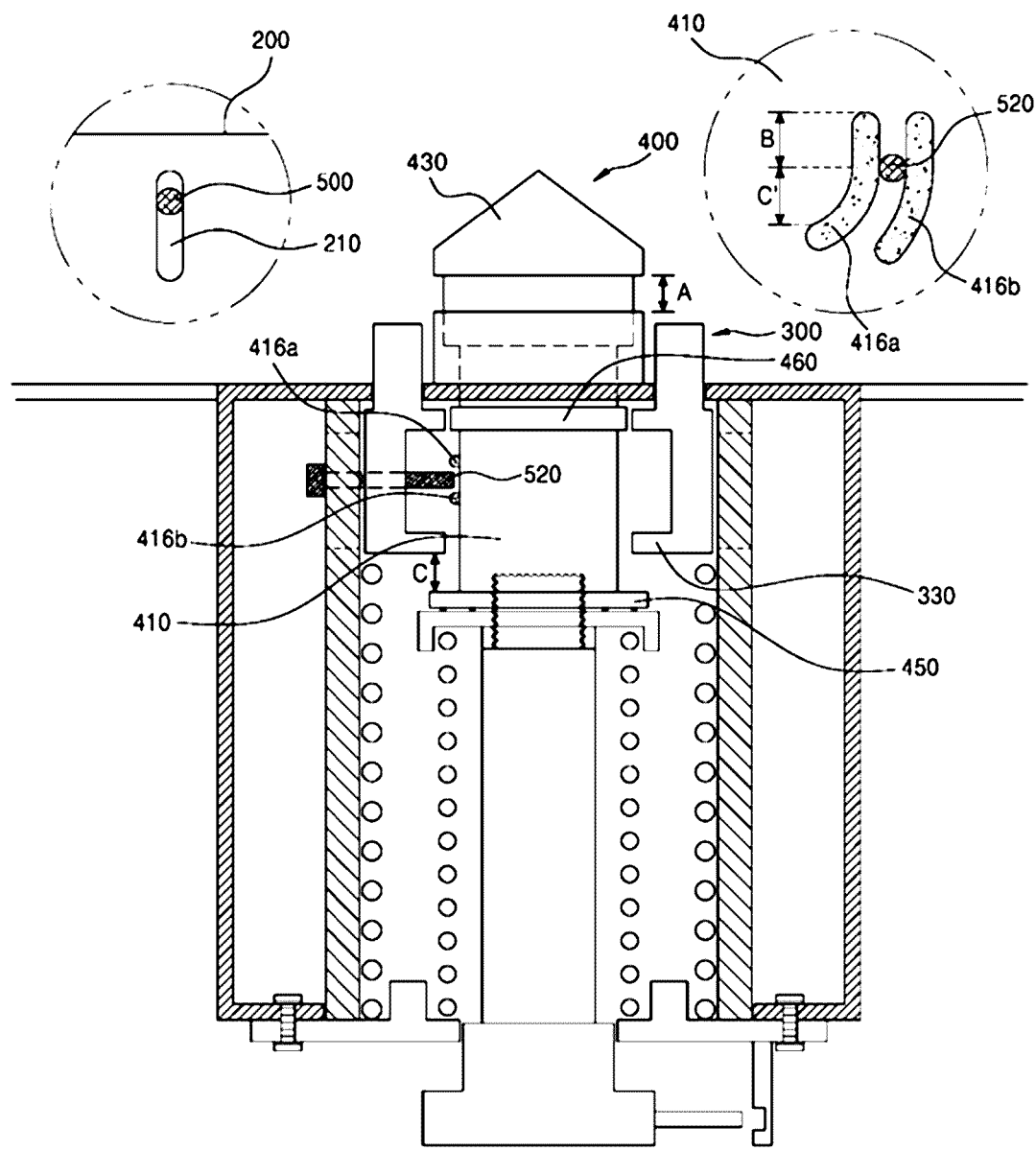
FIG. 6 is a sectional view showing a multifunctional locking device for a container for a trailer according to a fourth embodiment of the present invention.

FIG. 6 is a sectional view showing a multifunctional locking device for a container of a trailer according to a fourth embodiment of the present invention. Herein, FIG. 6 is a sectional view showing the locking device before operation, and a sectional view showing the locking device after operation is omitted.

Referring to FIG. 6, an induction portion 416 of the lock 400 is a pair of helical protrusions 416*a* and 416*b* formed along the circumferential surface of the body part 410, and the pair of helical protrusions 416*a* and 416*b* is disposed to be spaced apart from each other, such that the end portion 520 of the guide member 500 is accommodated in a gap defined therebetween. Here, it is preferred that the through-hole 210 of the inner housing 200 with the guide member 500 penetrating therethrough be formed in an oblong shape.

<Fifth Embodiment>

Figure 7:
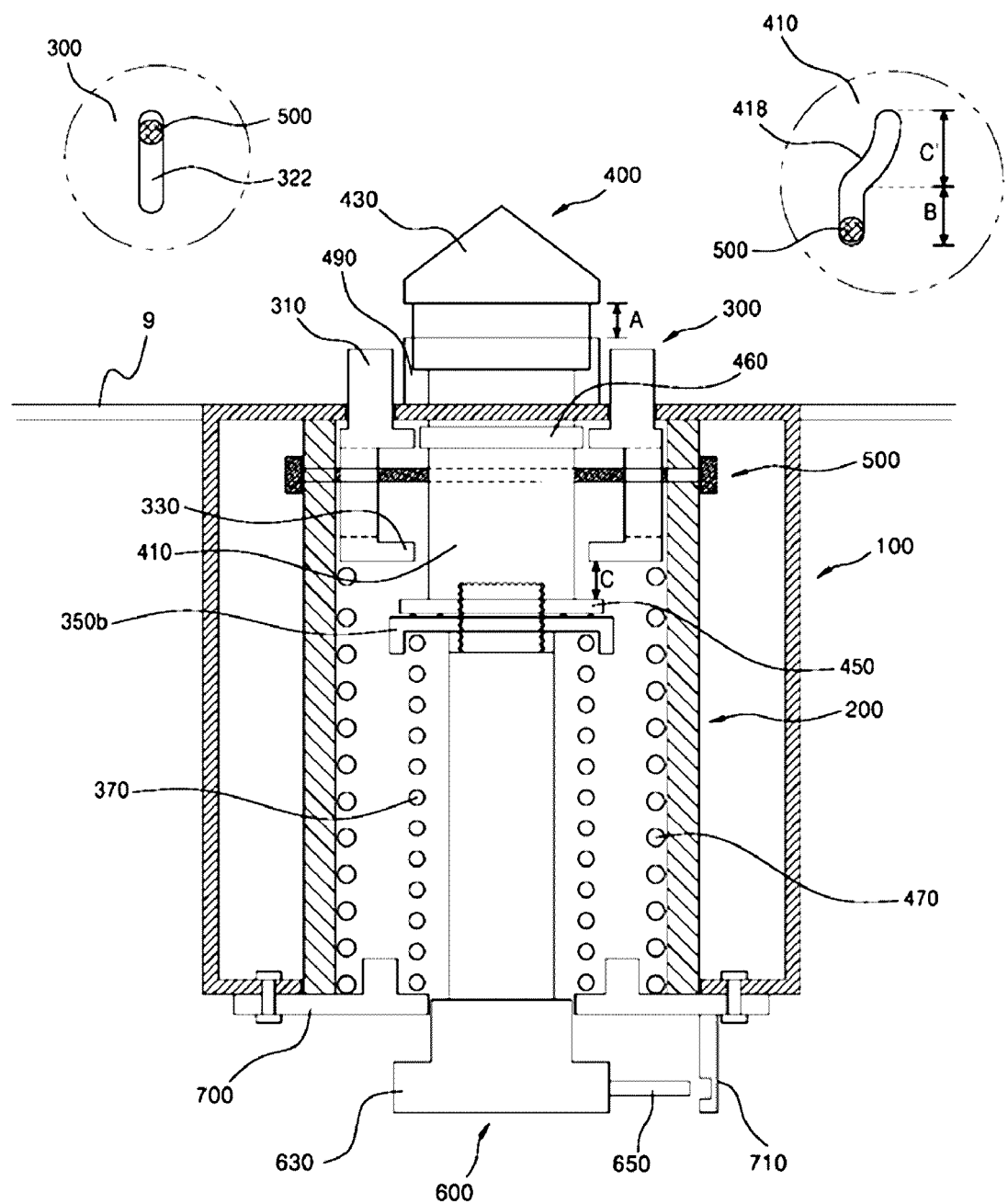
FIG. 7 is a sectional view showing a multifunctional locking device for a container for a trailer according to a fifth embodiment of the present invention.

FIG. 7 is a sectional view showing a multifunctional locking device for a container of a trailer according to a fifth embodiment of the present invention. Herein, FIG. 7 is a sectional view showing the locking device before operation, and a sectional view showing the locking device after operation is omitted.

Referring to FIG. 7, an induction portion 418 of the lock 400 is a helical hole 418 formed through the body part 410 so as to allow a portion of the guide member to be inserted thereinto. Here, it is preferred that the through-hole 322 of the automatic actuator 300 with the guide member 500 penetrating therethrough be formed in an oblong shape.

Meanwhile, as shown in FIGS. 4*a* to 7, it is preferred that at least one of opposite end portions of each of the variously illustrated induction portions 412, 414, 416, and 418 be bent in an axial direction of the body part 410.

As described in background art and technical solution, even if the head part 430 of the lock 400 is not correctly inserted into the connector of the container and is displaced, it is possible to prevent damage to the components coupled with the lock, and is possible to facilitate engagement.

In other words, even if the automatic actuator 300 or the lock 400 is moved upward or downward by an instantaneous external force, the lock 400 is not rotated for a period of time where it begins to move upward or downward by the axially bent end portion.

Accordingly, it is possible to prevent the guide member 500 coupled to the induction portion 412, 414, 416 from being damaged by the instantaneous impact or external force.

Herein, it is preferred that a length B of the bent end portion of the induction portion 412, 414, 416 be equal to a length A between the lower end of the head part 430 and the upper end of the horizontal anti-skid protrusion 490 in the state of the locking device before operation, so as to maintain engagement between the induction portion 412, 414, 416 and the guide member 500.

<Sixth Embodiment>

Figure 8:
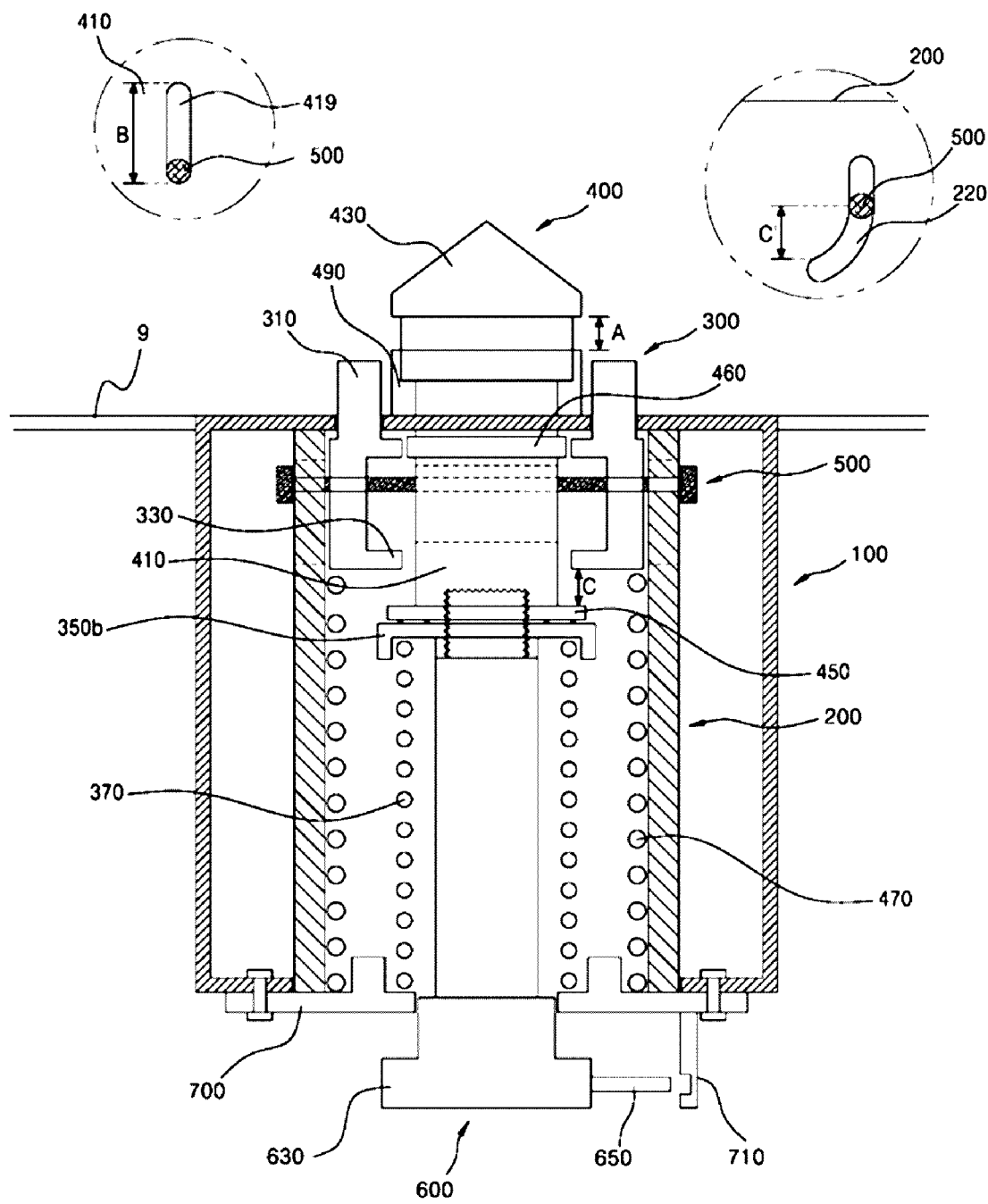
FIG. 8 is a sectional view showing a multifunctional locking device for a container for a trailer according to a sixth embodiment of the present invention.

FIG. 8 is a sectional view showing a multifunctional locking device for a container of a trailer according to a sixth embodiment of the present invention. Herein, FIG. 8 is a sectional view showing the locking device before operation, and a sectional view showing the locking device after operation is omitted.

The description of the same configuration as in the above embodiments will be omitted and only the configuration of the inner housing 200 and the lock 400 changed in this embodiment will be described.

Referring to FIG. 8, the inner housing 200 is provided with an induction hole 220 formed through a side thereof, and the guide member 500 is detachably coupled through the inside the automatic actuator 300 via the induction hole of the inner housing 200 so as to be engaged with a through-hole 419 formed in the body part 410 of the lock 400. Thereby, when the automatic actuator 300 is moved up and down, the guide member 500 slides along the induction hole 220 and the lock 400 is rotated.

Herein, it is preferred that the induction hole 220 be configured such that a pair of induction holes are formed to face each other to facilitate the rotation of the lock 400.

Further, it is preferred that the through-hole 419 of the lock 400 with the guide members 500 penetrating therethrough be formed in an oblong shape.

Meanwhile, as shown in FIGS. 4*a* to 8, it is preferred that the body part 410 of the lock 400 be provided with a second stop protrusion 460 spaced apart from the first stop protrusion 450 with the induction portion 412, 414, 416 or the through-hole 419 disposed therebetween, so as to limit the upward movement of the lock 400.

Thereby, if the upward movement of the lock 400 is limited at a predetermined position, the first stop member 330 of the automatic actuator 300 and the first stop protrusion 450 are not brought into contact with each other and spaced apart from each other at a predetermined interval C, which prevents misengagement when the head part 430 of the lock 400 rotates without being properly inserted into the connector of the container.

In other words, the interval C is the induction section where the head part 430 of the lock 400 is inserted into the connector of the container, wherein when the head part 430 of the lock 400 is moved downward without being properly inserted into the connector of the container, the bottom surface of the head part 430 comes into contact with the horizontal anti-skid protrusion 490, and the connector of the container slides to induce the head part to be properly inserted into the connector, thereby preventing damage to the components.

Accordingly, when the rotation of the lock 400 is completed and the head part 430 is positioned in the locking direction, the first stop member 330 pushes the first stop protrusion 450 down to move the lock 400 down, whereby the engagement of the container is completed.

Herein, it is preferred that the interval C between the first stop member 330 and the first stop protrusion 450 be equal to a height C' of a curved section of the induction portion 412, 414, 416, 418 or the induction hole 220, so as to facilitate engagement of the container.

As shown in FIGS. 9 to 12, the present invention, which may further include components or modified from the above-described embodiments, includes: an outer housing 1000 mounted to the upper frame 9, and provided with an opening portion on at least one surface thereof; an inner housing 2000 accommodated in the outer housing 1000 while being spaced apart therefrom; an automatic actuator 3000 accommodated in the inner housing 2000; a lock 4000 accommodated in a hollow portion of the automatic actuator 3000; a hollow inner tube 6000 accommodated in the inner housing 2000 while being spaced apart therefrom; a guide member 7000 rotating the lock 4000 according to up and down movement of the automatic actuator 3000; and a manual actuator 8000 configured to manually rotate the lock 4000 when the guide member 7000 is removed.

The outer housing 1000 is mounted to the upper frame 9, and is formed with an opening portion on at least one surface thereof. The opening portion is not specifically shown but is formed so that the guide member 7000 to be described hereinafter is visible when viewed from the outside.

Further, the outer housing 1000 is configured such that a pressing portion 3100 of the automatic actuator 3000 and a head part 4300 of the lock 4000 protrude above the upper frame 9. Herein, not show in the drawings, a shape of the hollow portion of the outer housing 1000 is formed to correspond to the peripheral shape of the pressing portion 3100, so as to facilitate the up and down movement of the pressing portion 3100 and to maintain the pressing portion 3100 at a predetermined location without being separated in the horizontal direction.

The inner housing 2000, which is accommodated in the outer housing 100 while being spaced apart therefrom, is formed in a hollow tube and is provided with at least one opening portion 2200.

Herein, the inner housing 2000 along with the inner tube 6000 with a support member 5000 supporting the same is accommodated in the outer housing 1000, and the support member 5000 is formed with a hollow portion, such that the manual actuator 8000 to be described hereinafter protrudes. The support member 5000 is coupled to the lower portion of the outer housing 1000, so that a first elastic member 5200 and a second elastic member 5400 as well as the inner housing 2000 and the inner tube 6000 can be supported together.

The automatic actuator 3000 is accommodated in the inner housing 2000, and is configured to move up and down by the first elastic member 5200 and the weight of the container CT.

Herein, the automatic actuator 3000 includes: the pressing portion 3100 moving out over the outer housing 1000 and the hollow portion of the inner housing 2000 as spaced apart from or brought into contact with the container CT; and a stop portion 3300 protruding in a direction from a lower portion of the pressing portion 3100 to the lock 4000 and moving a first stop protrusion 4500 down by coming into contact therewith.

The lock 4000 includes: a cylindrical body part 4100 accommodated in a hollow portion of the automatic actuator 3000 and moved up and down by both a second elastic member 5400 and the automatic actuator 3000; a head part 4300 provided in an upper portion of the body part 4100 and configured to be coupled to or released from a connector of the container according to a rotation angle; a stop protrusion 4500 provided on a first side of a circumferential surface of the body part 4100 to limit upward movement of the body part 4100; and an induction portion 4700*a*, 4700*b*, 4700*c* provided on a second side of the circumferential surface of the body part 4100 and configured to operate in conjunction with up and down movement of the automatic actuator 3000 so as to induce rotation of the body part 4100. Herein, various embodiments of the induction portion 4700*a*, 4700*b*, 4700*c* will be described hereinafter.

Meanwhile, the lock 4000 may further include a horizontal anti-skid protrusion 4900 surrounding a portion of the body part 4100 with a predetermined gap therebetween, wherein the horizontal anti-skid protrusion 4900 is fixed to the outer housing 1000 to protect the lock 4000 thereinside.

In other words, since the horizontal anti-skid protrusion 4900 surrounds the lock 4000 with the gap therebetween while being fixed to the outer housing 1000, it is possible to prevent impact applied directly to the lock 4000 due to a horizontal load applied to the container CT. Accordingly, it is possible to improve durability of the device, and is possible to minimize malfunction by simplifying the coupling structure.

The inner tube 6000, which is accommodated in the inner housing 2000 while being spaced apart therefrom, is formed in a hollow tube so as to accommodate a portion of the body part 4100 of the lock 4000. The inner tube 6000 is formed with a coupling hole with the guide member 7000 engaged therewith, and an inner circumferential surface of the coupling hole is formed with threads, thereby facilitating engagement with the guide member 7000.

The guide member 7000 is detachably coupled through from an outside of the inner tube 6000 to an inside thereof such that an end portion thereof is coupled to the induction portion 4700*a*, 4700*b*, 4700*c*, thereby rotating the lock 4000 to move up and down. An outer circumferential surface of the guide member 7000 is formed with threads, thereby being engaged with the coupling hole of the inner tube.

Meanwhile, not show in the drawings, a guide fixing member that is brought into contact with at least a portion of the guide member 7000 and fixed thereto is detachably coupled to the outside of the inner tube 6000, so as to prevent separation of the guide member 7000.

The manual actuator 8000 includes: a lock extension part 8100 detachably coupled to a lower portion of the body part 4100 of the lock 4000 to extend downward in a hollow portion of the inner housing 2000; a length adjusting part 8300 variably connected to a predetermined location along a longitudinal direction of the lock extension part 8100; and a lever 8500 protruding from a side of the length adjusting part 8300 to be operable by a user's hand.

The manual actuator 8000 is configured such that in the state where the guide member 7000 is engaged with the induction portion 4700*a*, 4700*b*, 4700*c* of the lock 4000, the manual actuator rotates in conjunction with the automatic actuator 3000, but in the state where the guide member 7000 is disengaged from the induction portion 4700*a*, 4700*b*, 4700*c* of the lock 4000, the manual actuator rotates regardless of the induction portion 4700*a*, 4700*b*, 4700*c*. Accordingly, by manually operating the lever 8500 to rotate the lock 4000, the head part 4300 of the lock 4000 is locked to or released from the connector of the container CT. Accordingly, even if the automatic locking and unlocking functions are not normally performed due to malfunction, it is possible to use locking and unlocking functions without restrictions by easily switching to a manual mode.

Meanwhile, the support member 5000 may be provided with a lever fixing member 5100 for fixing the lever 8500, wherein the lever fixing member 5100 is manually operated to fix the lever 8500, thereby preventing the lock 4000, especially in the state of being locked, from being rotated.

Hereinbelow, various embodiments of the present invention will be described in detail with reference to FIGS. 9 to 12. However, description of the configuration that is the same as the above described configuration will be omitted, and only the characteristically different configurations in the corresponding embodiment will be described in detail.

<Seventh Embodiment>

Figure 9A:
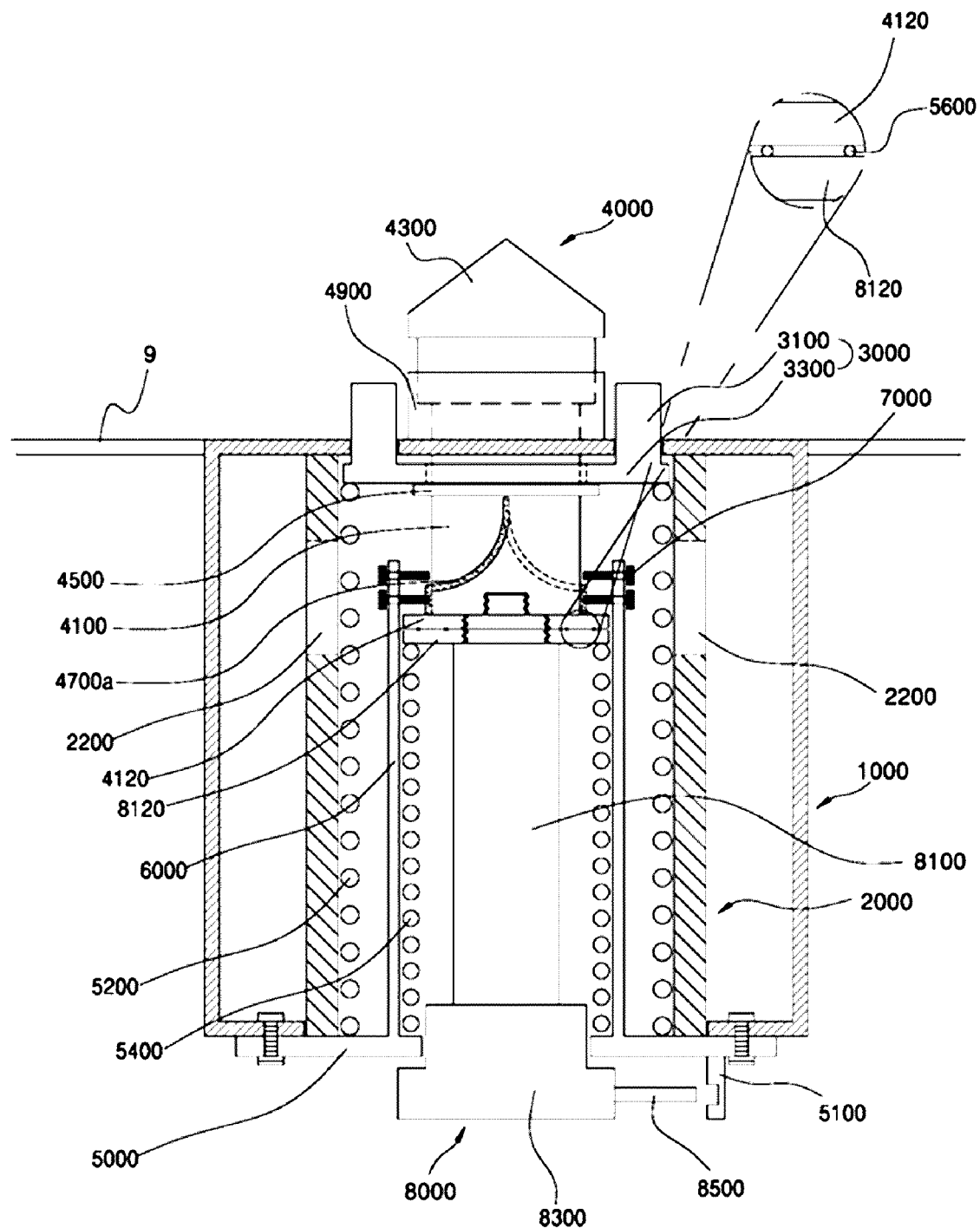
FIGS. 9a and 9b are sectional views showing a multifunctional locking device for a container for a trailer according to a seventh embodiment of the present invention.
Figure 9B:
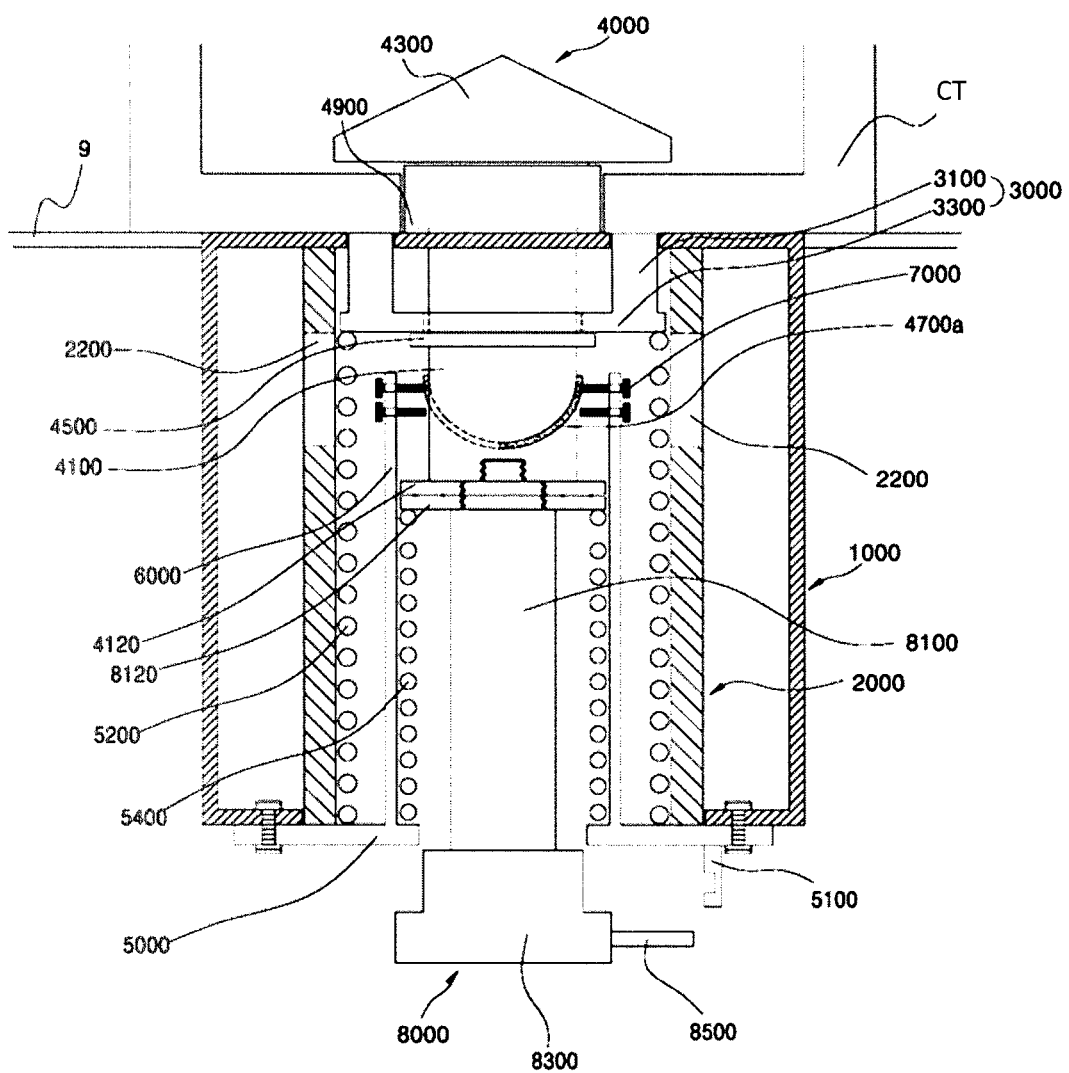

FIGS. 9*a* and 9*b* are sectional views showing a multifunctional locking device for a container of a trailer according to a seventh embodiment of the present invention. FIG. 9*a* shows the locking device before operation, in which the head part 4300 is not connected to the container, and FIG. 9*b* shows the locking device after operation, in which the automatic actuator 3000 is moved down and thereby the head part 4300 is rotated to be connected to the connector of the container CT.

Referring to FIGS. 9a and 9b, the induction portion 4700a of the lock 4000 is a helical protrusion formed along the circumferential surface of the body part 4100, and the guide member 7000 is configured such that a pair thereof is disposed to be spaced apart from each other, such that a portion of the helical protrusion is accommodated in a gap defined therebetween.

Meanwhile, the lower portion of the body part 4100 of the lock 4000 may be provided with a first coupling protrusion 4120 along an outer circumference, and an upper portion of the lock extension part 8100 of the manual actuator 8000 may be provided with a second coupling protrusion 8120. Herein, as seen from the enlarged view of FIG. 9a, one of the opposite surfaces to which the first coupling protrusion 4120 and the second coupling protrusion 8120 are coupled may be provided with an embossed buffering protrusion 5600, wherein the buffering protrusion 5600 disperses an impact load and reduces friction between the body part 4100 and the lock extension part 8100 when the lock 4000 is rotated.

<Eighth Embodiment>

Figure 10A:
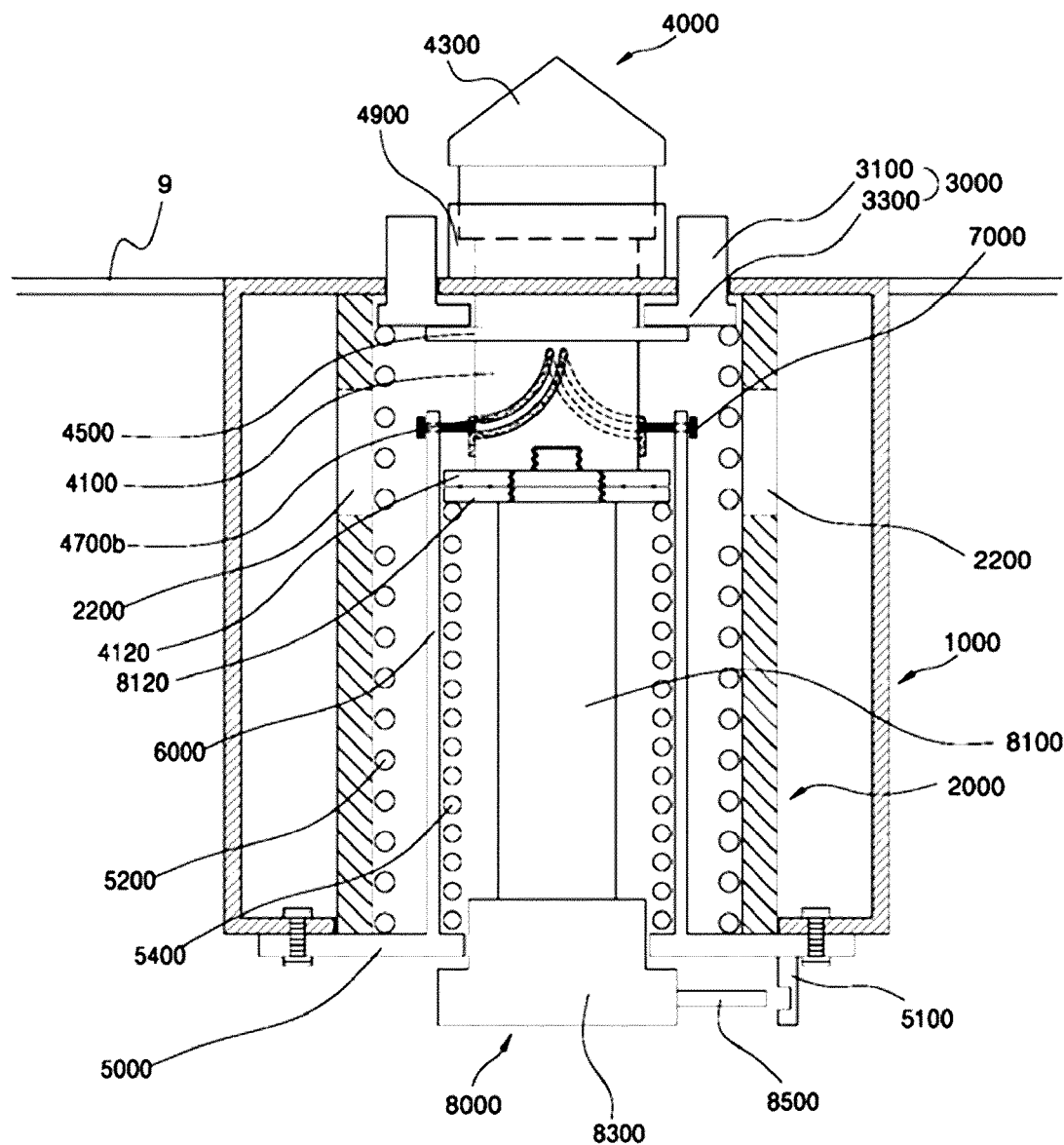
FIGS. 10a and 10b are sectional views showing a multifunctional locking device for a container for a trailer according to an eighth embodiment of the present invention.
Figure 10B:
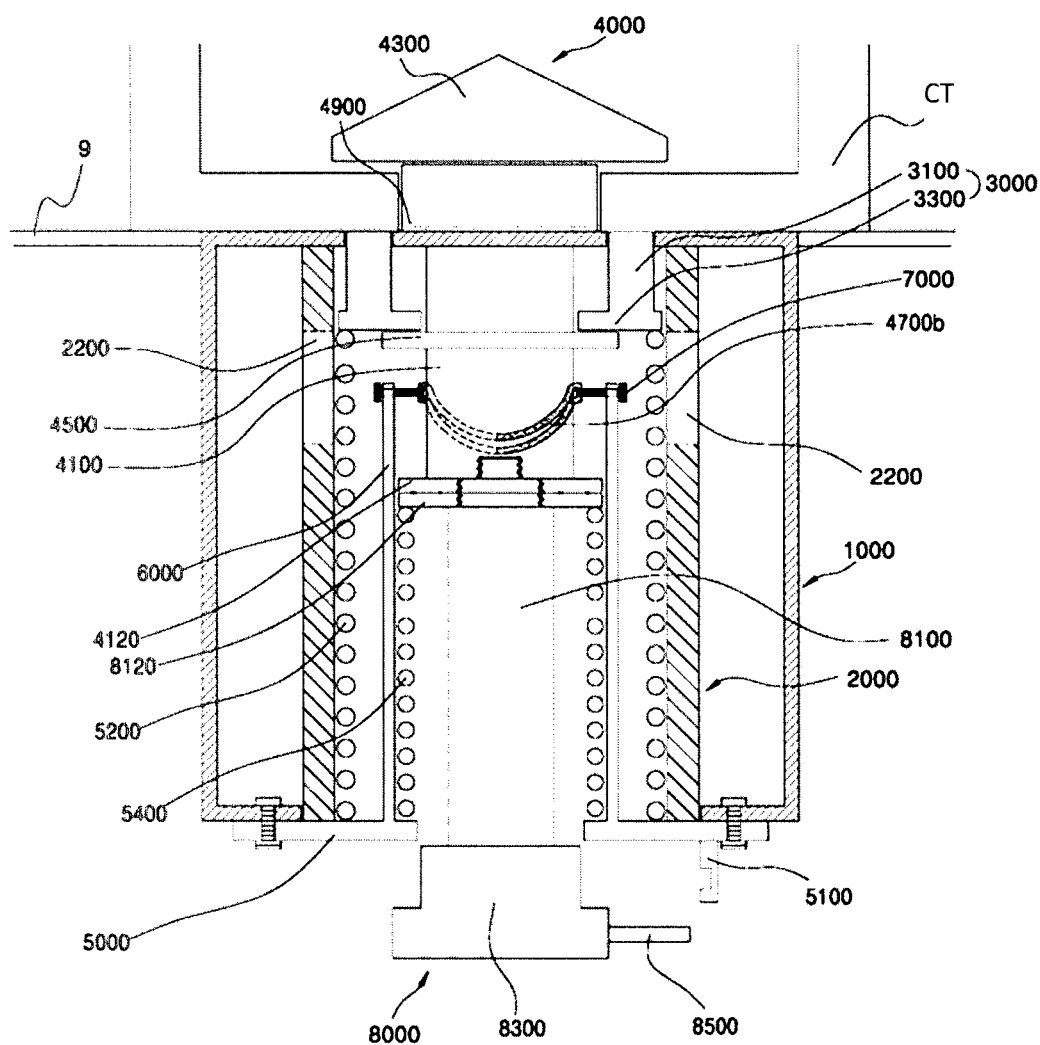

FIGS. 10a and 10b are sectional views showing a multifunctional locking device for a container of a trailer according to an eighth embodiment of the present invention. FIG. 10a shows the locking device before operation, in which the head part 4300 is not connected to the container, and FIG. 10b shows the locking device after operation, in which the automatic actuator 3000 is moved down and thereby the head part 4300 is rotated to be connected to the connector of the container CT.

Referring to FIGS. 10a and 10b, the induction portion 4700b of the lock 4000 is a pair of helical protrusions formed along the circumferential surface of the body part 4100, and the pair of helical protrusions is disposed to be spaced apart from each other, such that the end portion of the guide member 7000 is accommodated in a gap defined therebetween.

<Ninth Embodiment>

Figure 11A:
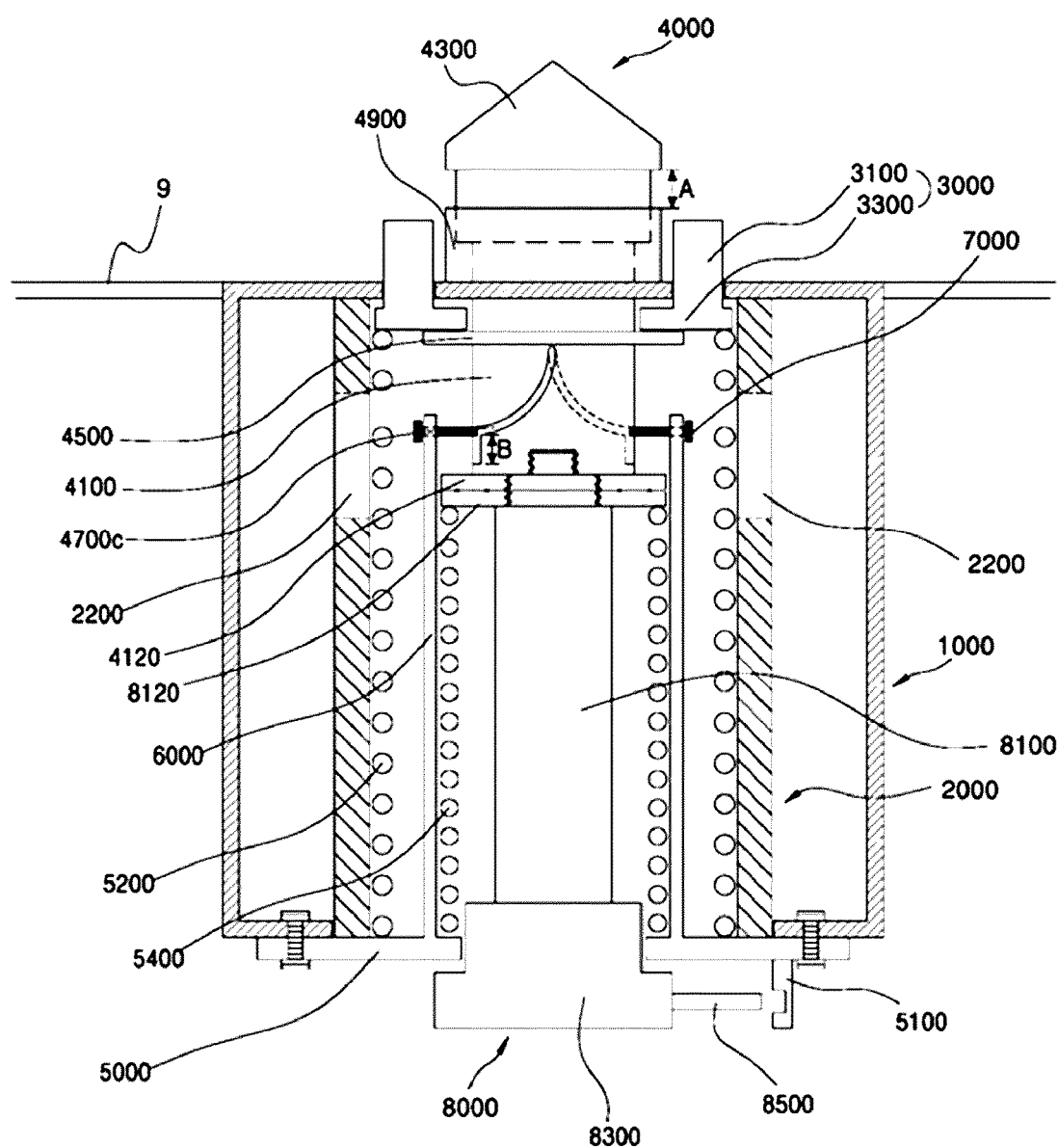
FIGS. 11a and 11b are sectional views showing a multifunctional locking device for a container for a trailer according to a ninth embodiment of the present invention.
Figure 11B:
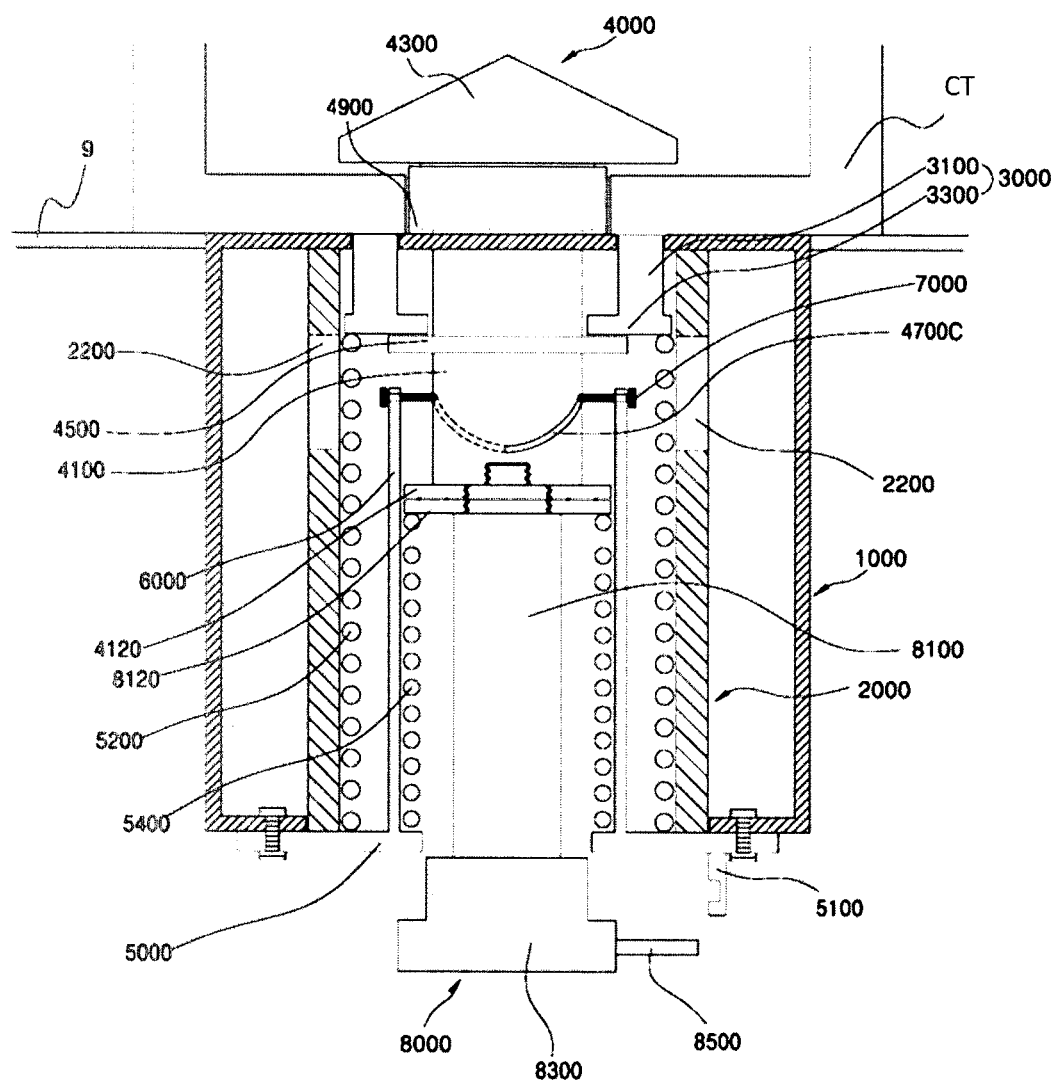

FIGS. 11a and 11b are sectional views showing a multifunctional locking device for a container of a trailer according to a ninth embodiment of the present invention. FIG. 11a shows the locking device before operation, in which the head part 4300 is not connected to the container, and FIG. 11b shows the locking device after operation, in which the automatic actuator 3000 is moved down and thereby the head part 4300 is rotated to be connected to the connector of the container CT.

Referring to FIGS. 11a and 11b, the induction portion 4700c of the lock 4000 is a helical groove formed along the circumferential surface of the body part 4100, so as to allow the end portion of the guide member 7000 to be inserted thereinto. In the embodiment, each of the induction portion 4700c and the guide member 7000 is provided in pair, but a single induction portion and a single guide member may be provided.

Meanwhile, it is preferred that at least one of opposite end portions of each of the variously illustrated induction portions 4700a, 4700b, and 4700c be bent in an axial direction of the body part 4100 of the lock 4000. As described in background art and technical solution, even if the head part 4300 of the lock 4000 is not correctly inserted into the connector of the container and is displaced, it is possible to prevent damage to the components coupled with the lock 4000, and is possible to facilitate engagement with the connector of the container.

In other words, even if the automatic actuator 3000 or the lock 4000 is moved upward or downward by an instantaneous external force, the lock 4000 is not rotated for a period of time where it begins to move upward or downward by the axially bent end portion.

Accordingly, it is possible to prevent the guide member 7000 coupled to the induction portion 4700a, 4700b, 4700c from being damaged by the instantaneous impact or external force.

Herein, referring to FIG. 11a, it is preferred that a length B of the bent end portion of the induction portion 4700a, 4700b, 4700c be equal to a length A between the lower end of the head part 4300 and the upper end of the horizontal anti-skid protrusion 4900 in the state of the locking device before operation, so as to maintain engagement between the induction portion 4700a, 4700b, 4700c and the guide member 7000.

<Tenth Embodiment>

Figure 12A:
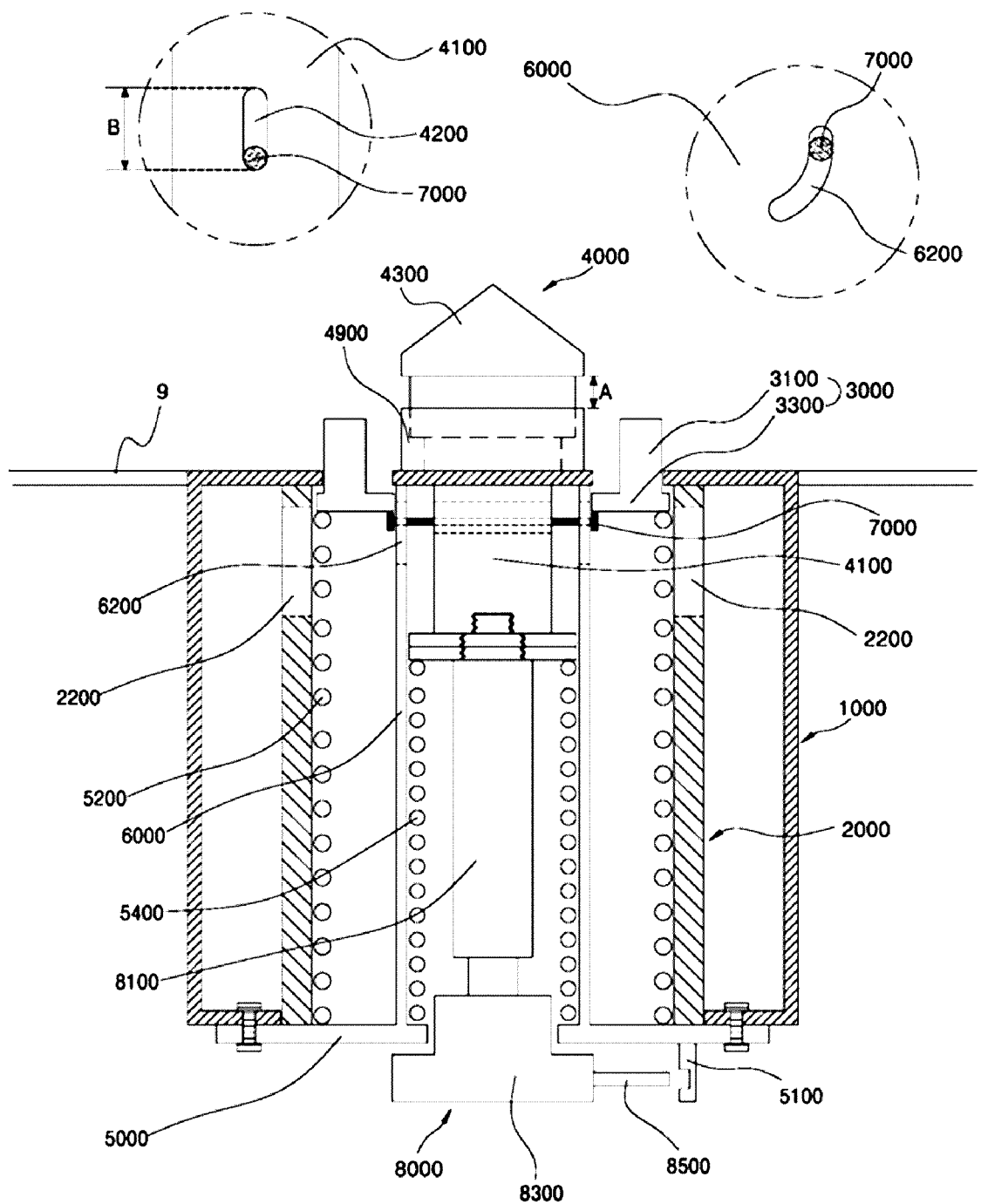
FIGS. 12a and 12b are sectional views showing a multifunctional locking device for a container for a trailer according to a tenth embodiment of the present invention.
Figure 12B:
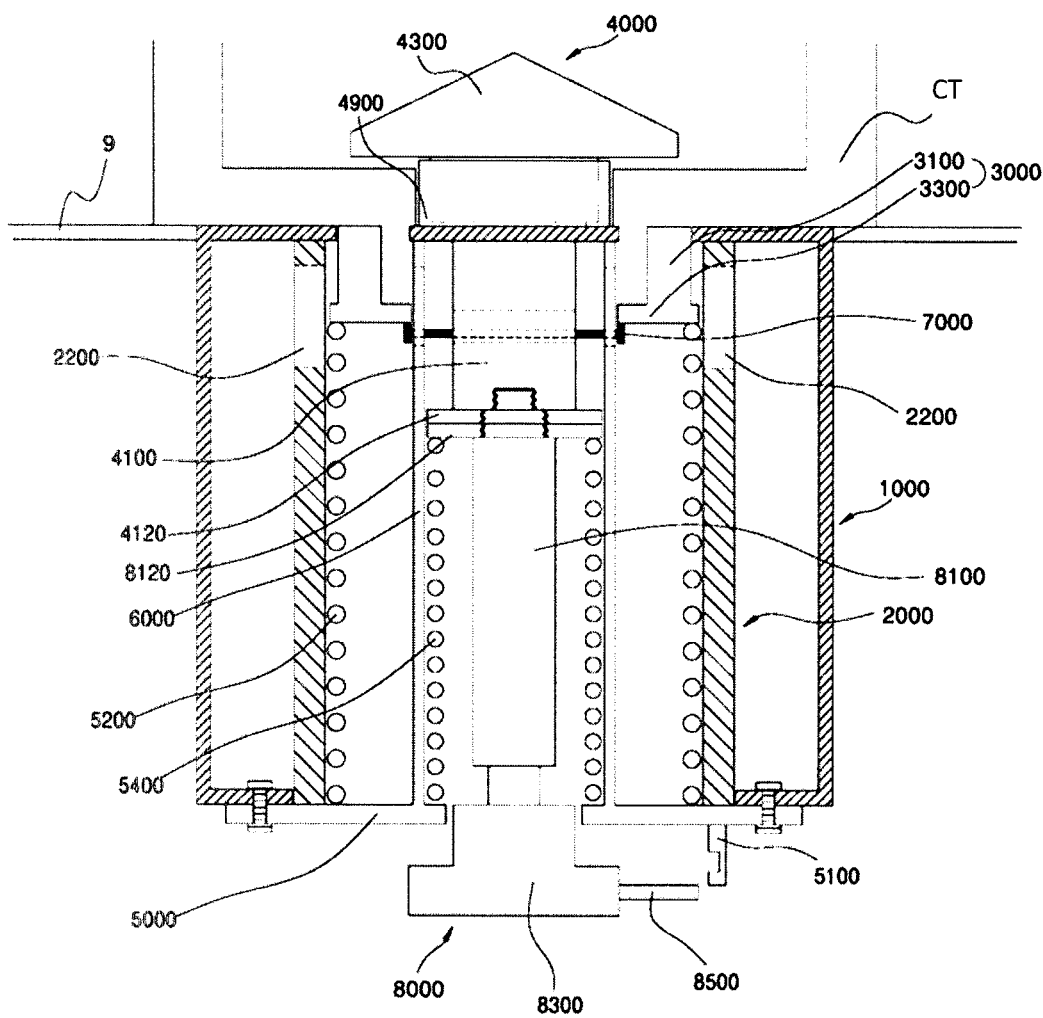

FIGS. 12a and 12b are sectional views showing a multifunctional locking device for a container of a trailer according to a tenth embodiment of the present invention. FIG. 12a shows the locking device before operation, in which the head part 4300 is not connected to the container, and FIG. 12b shows the locking device after operation, in which the automatic actuator 3000 is moved down and thereby the head part 4300 is rotated to be connected to the connector of the container CT.

Description of the configuration that is the same as the above described configuration will be omitted, and only the characteristically different configurations in the corresponding embodiment will be described in detail.

Referring to FIGS. 12a and 12b, the inner tube 6000 is provided at a side thereof with a helical induction hole 6200 formed therethrough, and the guide member 7000 is detachably coupled with a through-hole 4200 formed in the body part 4100 of the lock 4000 via the induction hole 6200. Thereby, when the automatic actuator 3000 is moved up and down, the guide member 7000 slides along the induction hole 6200 and the lock 4000 is rotated.

Herein, it is preferred that the through-hole 4200 of the body part 4100 with the guide member 7000 penetrating therethrough be formed in an oblong shape.

Here, it is preferred that a length B of the through-hole 4200 be equal to a length A between the lower end of the head part 4300 and the upper end of the horizontal anti-skid protrusion 4900 in the state of the locking device before operation, so as to maintain engagement between the induction hole 6200 and the guide member 7000.

Further, it is preferred that the induction hole 6200 be configured such that a pair of induction holes are formed to face each other to facilitate the rotation of the lock 4000.

Meanwhile, the guide member 7000 is configured such that an end portion thereof protrudes in a direction from the induction hole 6200 to the inner housing 2000 so as to limit upward movement of the body part 4100.

With reference to the above described embodiments of the present invention, the following effects can be expected.

First, even if the automatic locking and unlocking functions are not normally performed due to a malfunction, it is possible to use locking and unlocking functions without restrictions by easily switching to a manual mode.

Second, it is possible to improve durability of the device by preventing impact applied directly to the lock due to a horizontal load applied to the container, and is possible to minimize malfunction by simplifying the coupling structure.

Third, even if the head part of the lock is moved downward without being properly inserted into the connector of the container, it is possible to prevent damage to the components coupled with the lock, and is possible to facilitate engagement with the connector of the container.

Fourth, since automatic locking function is performed, it is possible to improve the efficiency of work when the container is loaded and unloaded.

Fifth, it is possible to secure safety by maintaining the locking state at all times when transporting a container.

Sixth, it is possible to pursue the convenience of a driver by combining both automatic and manual modes.

Although reference to the embodiments has allowed the present invention to be described in more detail, it should be understood that the present invention is not limited to the embodiments but may be variously changed without departing from the technical idea of the present invention. Therefore, the embodiments disclosed in the present invention are not restrictive but are illustrative, and the scope of the technical idea of the present invention is not limited to the embodiments. The scope of the present invention should be interpreted by the accompanying claims, and it is to be understood that all technical ideas within the claims fall within the purview of the present invention.

The invention claimed is:

1. A multifunctional locking device for a container of a trailer, which is provided in an upper frame of the trailer in plural so as to lock the container to the upper frame, the multifunctional locking device comprising:
   an outer housing mounted to the upper frame and provided with an opening portion on at least one surface thereof;
   a hollow inner housing accommodated in the outer housing while being spaced apart therefrom;
   an automatic actuator accommodated in the inner housing, and configured to move up and down by a first elastic member and weight of the container;
   a lock including a cylindrical body part accommodated in a hollow portion of the automatic actuator, a head part provided in an upper portion of the body part and inserted into a connector of the container, a first stop protrusion provided on a first side of a circumferential surface of the body part and configured to operate in conjunction with up and down movement of the automatic actuator, and an induction portion formed on a second side of the circumferential surface of the body part and configured to operate in conjunction with the up and down movement of the automatic actuator so as to induce rotation of the body part;
   a guide member detachably coupled to an inside of the automatic actuator by passing the inner housing from outside of the inner housing such that an end portion is coupled to the induction portion, thereby rotating the lock according to the up and down movement of the automatic actuator; and
   a manual actuator including a lock extension part detachably coupled to a lower portion of the body part of the lock to extend downward in a hollow portion of the inner housing, a length adjusting part variably connected to the lock extension part such that a position of the length adjusting part relative to a length of the lock extension part is adjustable, and a lever protruding from a side of the length adjusting part to be operable by a user's hand.

2. The multifunctional locking device of claim 1, further comprising:
   a horizontal anti-skid protrusion surrounding a portion of the body part of the lock with a predetermined gap therebetween.

3. The multifunctional locking device of claim 1, wherein the automatic actuator includes:
   a pressing portion moving out over the outer housing and the hollow portion of the inner housing as spaced apart from or brought into contact with the container;
   a first stop member extending from a lower portion of the pressing portion and being configured to move the first stop protrusion down by coming into contact therewith; and
   a second stop member disposed at a lower portion of the first stop member and configured to move the first stop protrusion up by coming into contact therewith.

4. The multifunctional locking device of claim 3, wherein the second stop member is a member coupled to the lower portion of the first stop member and elastically supported by the first elastic member, and
   the first stop member and the second stop member are disposed to be spaced apart from each other, such that a portion of the first stop protrusion is accommodated in a gap defined therebetween.

5. The multifunctional locking device of claim 3, wherein the second stop member is a member coupled to a lower portion of the first stop protrusion and elastically supported by a second elastic member, and
   the body part of the lock is provided with a second stop protrusion spaced apart from the first stop protrusion with the induction portion disposed therebetween, so as to restrict upward movement of the lock.

6. The multifunctional locking device of claim 5, wherein one of the opposite surfaces to which the second stop member and the first stop protrusion are coupled is provided with an embossed buffering protrusion.

7. The multifunctional locking device of claim 1, wherein the induction portion of the lock is a helical groove formed along the circumferential surface of the body part, so as to allow the end portion of the guide member to be inserted thereinto.

8. The multifunctional locking device of claim 7, wherein at least one of opposite end portions of the induction portion is bent in an axial direction of the body part.

9. The multifunctional locking device of claim 1, wherein the induction portion of the lock is a helical protrusion formed along the circumferential surface of the body part, and the guide member is configured such that a pair thereof is disposed to be spaced apart from each other, such that a portion of the helical protrusion accommodated in a gap defined therebetween.

10. The multifunctional locking device of claim 9, wherein at least one of opposite end portions of the induction portion is bent in an axial direction of the body part.

11. The multifunctional locking device of claim 1, wherein the induction portion of the lock is a pair of helical protrusions formed along the circumferential surface of the body part, the pair of helical protrusions is disposed to be spaced apart from each other, such that the end portion of the guide member is accommodated in a gap defined therebetween.

12. The multifunctional locking device of claim 11, wherein at least one of opposite end portions of the induction portion is bent in an axial direction of the body part.

13. The multifunctional locking device of claim 1, wherein the induction portion of the lock is a helical hole formed through the body part, so as to allow a portion of the guide member to be inserted thereinto.

14. The multifunctional locking device of claim 13, wherein at least one of opposite end portions of the induction portion is bent in an axial direction of the body part.

15. A multifunctional locking device for a container of a trailer, which is provided in an upper frame of the trailer in plural so as to lock the container to the upper frame, the multifunctional locking device comprising:

an outer housing mounted to the upper frame and provided with an opening portion on at least one surface thereof;

a hollow inner housing accommodated in the outer housing while being spaced apart therefrom, and provided with a helical induction hole formed through the inner housing;

an automatic actuator accommodated in the inner housing, and configured to move up and down by a first elastic member and weight of the container;

a lock including a cylindrical body part accommodated in a hollow portion of the automatic actuator, a head part provided in an upper portion of the body part and inserted into a connector of the container, and a first stop protrusion provided on a first side of a circumferential surface of the body part and configured to operate in conjunction with up and down movement of the automatic actuator;

a guide member detachably coupled through an inside of the automatic actuator via the induction hole of the inner housing to be engaged with a through-hole formed in the body part of the lock, thereby rotating the lock according to the up and down movement of the automatic actuator; and a manual actuator including a lock extension part detachably coupled to a lower portion of the body part of the lock to extend downward in a hollow portion of the inner housing, a length adjusting part variably connected to the lock extension part such that a position of the length adjusting part relative to a length of the lock extension part is adjustable, and a lever protruding from a side of the length adjusting part to be operable by a user's hand.

16. A multifunctional locking device for a container of a trailer, which is provided in an upper frame of the trailer in plural so as to lock the container to the upper frame, the multifunctional locking device comprising:

an outer housing mounted to the upper frame and provided with an opening portion on at least one surface thereof;

a hollow inner housing accommodated in the outer housing while being spaced apart therefrom and provided with at least one opening portion;

an automatic actuator accommodated in the inner housing, and configured to move up and down by a first elastic member and weight of the container;

a lock including a cylindrical body part accommodated in a hollow portion of the automatic actuator and moved up and down by both a second elastic member and the automatic actuator, a head part provided in an upper portion of the body part and configured to be coupled to or released from a connector of the container according to a rotation angle, a stop protrusion provided on a first side of a circumferential surface of the body part to limit upward movement of the body part, and an induction portion provided on a second side of the circumferential surface of the body part and configured to operate in conjunction with up and down movement of the automatic actuator so as to induce rotation of the body part;

a hollow inner tube accommodated in the inner housing while being spaced apart therefrom and configured to accommodate the second elastic member and a portion of the body part of the lock;

a guide member detachably coupled to an inside of the inner tube by passing the inner tube from outside of the inner tube such that an end portion thereof is coupled to the induction portion, thereby rotating the lock to move up and down; and a manual actuator including a lock extension part detachably coupled to a lower portion of the body part of the lock to extend downward in a hollow portion of the inner housing, a length adjusting part variably connected to the lock extension part such that a position of the length adjusting part relative to a length of the lock extension part is adjustable, and a lever protruding from a side of the length adjusting part to be operable by a user's hand.

17. The multifunctional locking device of claim 16, wherein the lower portion of the body part of the lock is provided with a first coupling protrusion along an outer circumference, an upper portion of the lock extension part of the manual actuator is provided with a second coupling protrusion, and one of the opposite surfaces to which the first coupling protrusion and the second coupling protrusion are coupled is provided with an embossed buffering protrusion.

18. A multifunctional locking device for a container of a trailer, which is provided in an upper frame of the trailer in plural so as to lock the container to the upper frame, the multifunctional locking device comprising:

an outer housing mounted to the upper frame and provided with an opening portion on at least one surface thereof;

a hollow inner housing accommodated in the outer housing while being spaced apart therefrom and provided with at least one opening portion;

an automatic actuator accommodated in the inner housing, and configured to move up and down by a first elastic member and weight of the container;

a lock including a cylindrical body part accommodated in a hollow portion of the automatic actuator and moved up and down by both a second elastic member and the automatic actuator, and a head part provided in an upper portion of the body part and configured to be coupled to or released from a connector of the container according to a rotation angle;

a hollow inner tube accommodated in the inner housing while being spaced apart therefrom with the automatic actuator disposed therebetween, configured to accommodate the second elastic member and the body part, and provided at a side thereof with a helical induction hole formed therethrough;

a guide member detachably coupled with a through-hole formed in the body part of the lock via the induction hole, thereby rotating the lock according to up and down movement of the automatic actuator; and a manual actuator including a lock extension part detachably coupled to a lower portion of the body part of the lock to extend downward in a hollow portion of the inner housing, a length adjusting part variably connected to the lock extension part such that a position of the length adjusting part relative to a length of the lock extension part is adjustable, and a lever protruding from a side of the length adjusting part to be operable by a user's hand.

19. The multifunctional locking device of claim 18, wherein the guide member is configured such that an end portion thereof protrudes in a direction from the induction hole to the inner housing so as to limit upward movement of the body part.

* * * * *